United States Patent
Elbaum

(10) Patent No.: US 10,090,025 B2
(45) Date of Patent: Oct. 2, 2018

(54) DISCHARGING ELECTRIC CHARGE IN INTEGRATED CIRCUIT UNLESS IN-SPECIFICATION CONDITION(S) DETECTED

(71) Applicant: Cisco Technology, Inc., San Jose, CA (US)

(72) Inventor: Reuven Elbaum, Haifa (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/292,616

(22) Filed: Oct. 13, 2016

(65) Prior Publication Data

US 2018/0108386 A1  Apr. 19, 2018

(51) Int. Cl.
G11C 5/14 (2006.01)
G06F 21/79 (2013.01)
G06F 21/76 (2013.01)
G11C 7/24 (2006.01)
G11C 16/22 (2006.01)

(52) U.S. Cl.
CPC .............. *G11C 5/148* (2013.01); *G06F 21/76* (2013.01); *G06F 21/79* (2013.01); *G11C 5/14* (2013.01); *G11C 7/24* (2013.01); *G11C 16/22* (2013.01)

(58) Field of Classification Search
CPC  G11C 5/14; G11C 5/148; G06F 21/75; G06F 21/79
USPC ...... 365/226, 203, 204, 205, 189.07, 189.09
See application file for complete search history.

(56) References Cited

U.S. PATENT DOCUMENTS

| | | |
|---|---|---|
| 5,923,582 A | 7/1999 | Voss |
| 6,747,440 B2 | 6/2004 | Weder |
| 7,316,934 B2 | 1/2008 | Mangell |
| 7,433,224 B1 | 10/2008 | Dunlap et al. |
| 7,498,644 B2 | 3/2009 | Shapiro et al. |
| 8,242,775 B2 | 8/2012 | Sudai et al. |
| 8,331,189 B1 | 12/2012 | Pancoast et al. |
| 8,351,174 B1 | 1/2013 | Gardner et al. |
| 8,458,804 B1 | 6/2013 | Hyde |
| 8,650,639 B2 | 2/2014 | Adams et al. |
| 8,874,926 B1 | 10/2014 | Edwards et al. |
| 8,913,745 B2 | 12/2014 | Shen-Orr et al. |
| 2004/0179391 A1* | 9/2004 | Bhattacharyya ............ H01L 21/28194 365/149 |
| 2005/0001232 A1* | 1/2005 | Bhattacharyya ........ G11C 11/40 257/133 |
| 2008/0012603 A1 | 1/2008 | Wadhwa |
| 2013/0015517 A1* | 1/2013 | Widjaja ................ G11C 11/404 257/316 |

(Continued)

OTHER PUBLICATIONS

Detect Power Tampering to Help Secure IOT Devices available on the web at: http://www.digikey.com/en/articles/techzone/2015/jul/detect-power-tampering-to-help-secure-iot-devices: Contributed by Digi-Key's European Editors; Jul. 28, 2015.

(Continued)

*Primary Examiner* — Gene Auduong

(57) ABSTRACT

In one embodiment, an integrated circuit comprises a volatile memory including a plurality of memory cells, a detector to detect one or more in-specification conditions, and a discharger, external to the volatile memory, to discharge electric charge stored in the integrated circuit, including electric charge stored in the volatile memory, unless the detector detects the one or more conditions.

20 Claims, 14 Drawing Sheets

(56) References Cited

U.S. PATENT DOCUMENTS

2015/0097607 A1    4/2015  Wang
2015/0356296 A1    12/2015 Teglia

OTHER PUBLICATIONS

Gruhn, Michael et al; "On the Practicability of Cold Boot Attacks," Availability, Reliability and Security (ARES), Eighth International Conference, Regensburg, 2013, pp. 390-397.

Kai, Yu et al; "Security Strategy of Powered-Off Sram for Resisting Physical Attack to Data Remanence" in Journal of Semiconductors, vol. 30, Issue 9, article id. 095010, 5 pp. (2009).

Karl, Eric et al; "A 4.6 GHz 162Mb SRAM design in 22nm tri-gate CMOS technology with integrated active V MIN-enhancing assist circuitry"; in Solid-State Circuits Conference Digest of Technical Papers (ISSCC), 2012 IEEE International, pp. 230-232.

Le, H.B. et al; "A Long Reset-Time Power-On Reset Circuit With Brown-Out Detection Capability," in IEEE Transactions on Circuits and Systems II: Express Briefs, vol. 58, No. 11, pp. 778-782, Nov. 2011.

Nedospasov, Dmitry et al; "Invasive PUF Analysis", Fault Diagnosis and Tolerance in Cryptography (FDTC'13), 2013, pp. 30-38.

Wang, Y. et al; "Dynamic Behavior of SRAM Data Retention and a Novel Transient Voltage Collapse Technique for 0.6v 32nm LP SRAM"; Electron Devices Meeting (IEDM), 2011 IEEE International, Washington, DC, pp. 32.1.1-32.1.4.

Wetzels, A.L.G.M; "Hidden in Snow, Revealed in Thaw Cold Boot Attacks Revisited"; 2014.

Wikipedia; Cold Boot Attack (2016); Can be seen at: https://en.wikipedia.org/wiki/Cold_boot_attack.

Xiaopeng, Lv et al; "An On-Chip Low Drop-Out Voltage Regulator with 150ma Driving Capability", in Proceedings of the World Congress on Engineering and Computer Science 2011 vol. II WCECS 2011, Oct. 19-21, 2011, San Francisco, USA.

Xu, Xiaolin et al; "Reliable Physical Unclonable Functions Using Data Retention Voltage of SRAM Cells." Computer-Aided Design of Integrated Circuits and Systems, IEEE Transactions on 34, No. 6 (2015): 903-914.

* cited by examiner

DISCHARGING ELECTRIC CHARGE IN INTEGRATED CIRCUIT UNLESS IN-SPECIFICATION CONDITION(S) DETECTED

TECHNICAL FIELD

The present disclosure generally relates to protection of volatile memory.

BACKGROUND

An attacker with physical access to volatile memory, may try to access data in the volatile memory. Optionally the data in the volatile memory may include encryption keys and/or other sensitive data.

The attacker may use any appropriate technique to access the data in the volatile memory. One such technique is laser scanning in which an integrated circuit with volatile memory may be scanned with a laser beam. The laser illumination stimulus may increase current passing through a scanned device. When a memory cell is scanned with a laser, current changes may depend on the stored bit content (either logical "0" or "1"). The current signal may therefore be measured to determine the memory cell's content.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

Figure 1A:
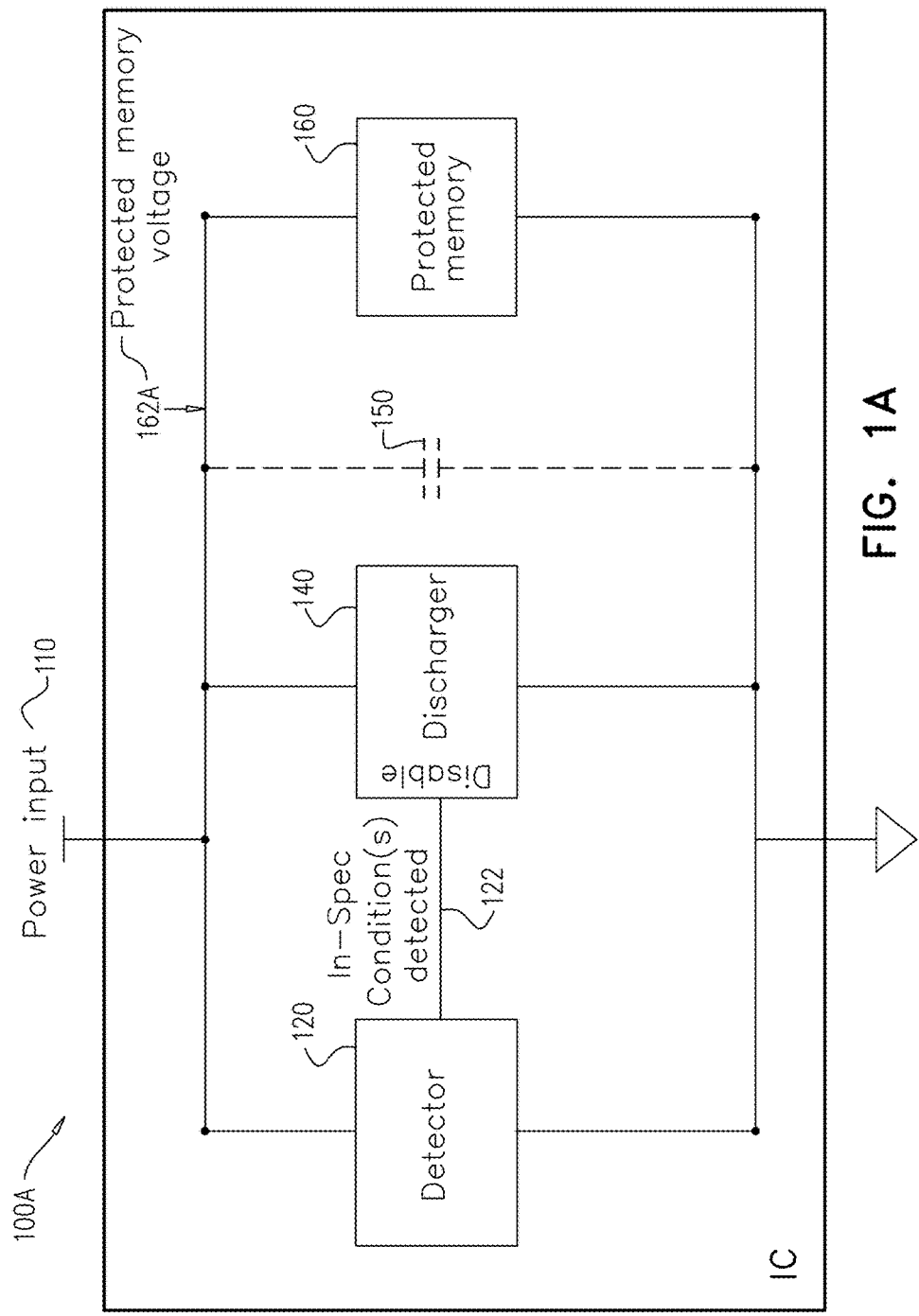
FIGS. 1A and 1B are schematic illustrations of an integrated circuit, in accordance with some embodiments of the present disclosure.

There is provided in accordance with some embodiments of the present disclosure, an integrated circuit comprising a volatile memory including a plurality of memory cells; a detector to detect one or more in-specification conditions; and a discharger, external to the volatile memory, to discharge electric charge stored in the integrated circuit, including electric charge stored in the volatile memory, unless the detector detects the one or more conditions.

Example Embodiments

In accordance with some embodiments of the present disclosure, when certain parameters are within specification for an integrated circuit, the integrated circuit may operate correctly. Parameter(s) may include, for example, voltage difference, voltage, clock rate, (operating) temperature, current, power, light absorption, radiation absorption, etc., relating to the integrated circuit as a whole and/or for element(s) in the integrated circuit. A parameter may be outside of specification and/or may not be detectable, for any reason. However, in some cases a parameter may go out of specification, and/or may not be detectable due to an attack, for example by an attacker that is attempting to access data in a volatile memory in an integrated circuit. For instance, if the attack includes cutting off the integrated circuit from an external power source, parameter(s) such as voltage difference, voltage, current, power, clock rate, etc. may go out of specification. For another instance, a Brown Out Event may be induced, e.g. in an integrated circuit, by causing the voltage supplied to the integrated circuit to drop to a much lower value which is above zero volts, but is nevertheless out of specification. For another instance, an attack may include cooling the integrated circuit, thereby causing the temperature to go below specification. Such attacks may additionally or alternatively impede detection. Possible types of attacks are not bound by the above examples.

Therefore, in accordance with some embodiments of the present disclosure, in-specification condition(s) may be selected to be detected by an integrated circuit that includes volatile memory. For example, in-specification condition(s) may be detected when parameter(s) may ensure correct operation of the integrated circuit, due to being within specification for the integrated circuit. Unless the in-specification condition(s) are detected, electric charge stored in the integrated circuit, including electric charge stored in the volatile memory may be discharged. Optionally, normal operation of a charger in the integrated circuit may also be disabled. It should be understood that the non-detection of an in-specification condition may not necessarily occur because of an attack. However, embodiments of the present disclosure include discharging and optionally disabling of normal operation of a charger, inter-alia in the case that an attack caused at least one of the in-specification condition(s) to not be detected, e.g. by causing a parameter to be out of specification and/or e.g. by causing no power or insufficient power for detection (thereby impeding detection). Additional details are provided below.

In the following description of example embodiments, numerous specific details are set forth in order to provide a thorough understanding of the subject matter. However, it will be understood by those skilled in the art that some examples of the subject matter may be practiced without these specific details. In other instances, well-known features have not been described in detail so as not to obscure the subject matter.

Usage of the terms "normally", "typically although not necessarily", "although not necessarily so", "such as", "e.g.", "possibly", "it is possible", "optionally", "say", "one embodiment", "embodiments", "an embodiment", "some embodiments", "certain embodiments", "example embodiments", "various embodiments", "other embodiments", "some other embodiments", "illustrated embodiment", "another embodiment", "for example" "one example", "an example" "some examples", "examples", "another example", "various examples", "other examples", "for instance", "an instance", "one instance", "some instances", "another instance", "other instances", "various instances" "one case", "cases", "some cases", "another case", "other cases", "various cases", or variants thereof should be construed as meaning that a particular described feature is included in at least one non-limiting embodiment of the subject matter, but not necessarily in all embodiments. The appearance of the same term does not necessarily refer to the same embodiment(s).

The term "illustrated embodiment", is used to direct the attention of the reader to one or more of the figures, but should not be construed as necessarily favoring any embodiments over any other.

Usage of conditional language, such as "may", "can", "could", or variants thereof should be construed as conveying that one or more embodiments of the subject matter may include, while one or more other embodiments of the subject matter may not necessarily include, a particular described feature. Thus such conditional language is not generally intended to imply that a particular described feature is necessarily included in all embodiments of the subject matter.

Figure 1B:
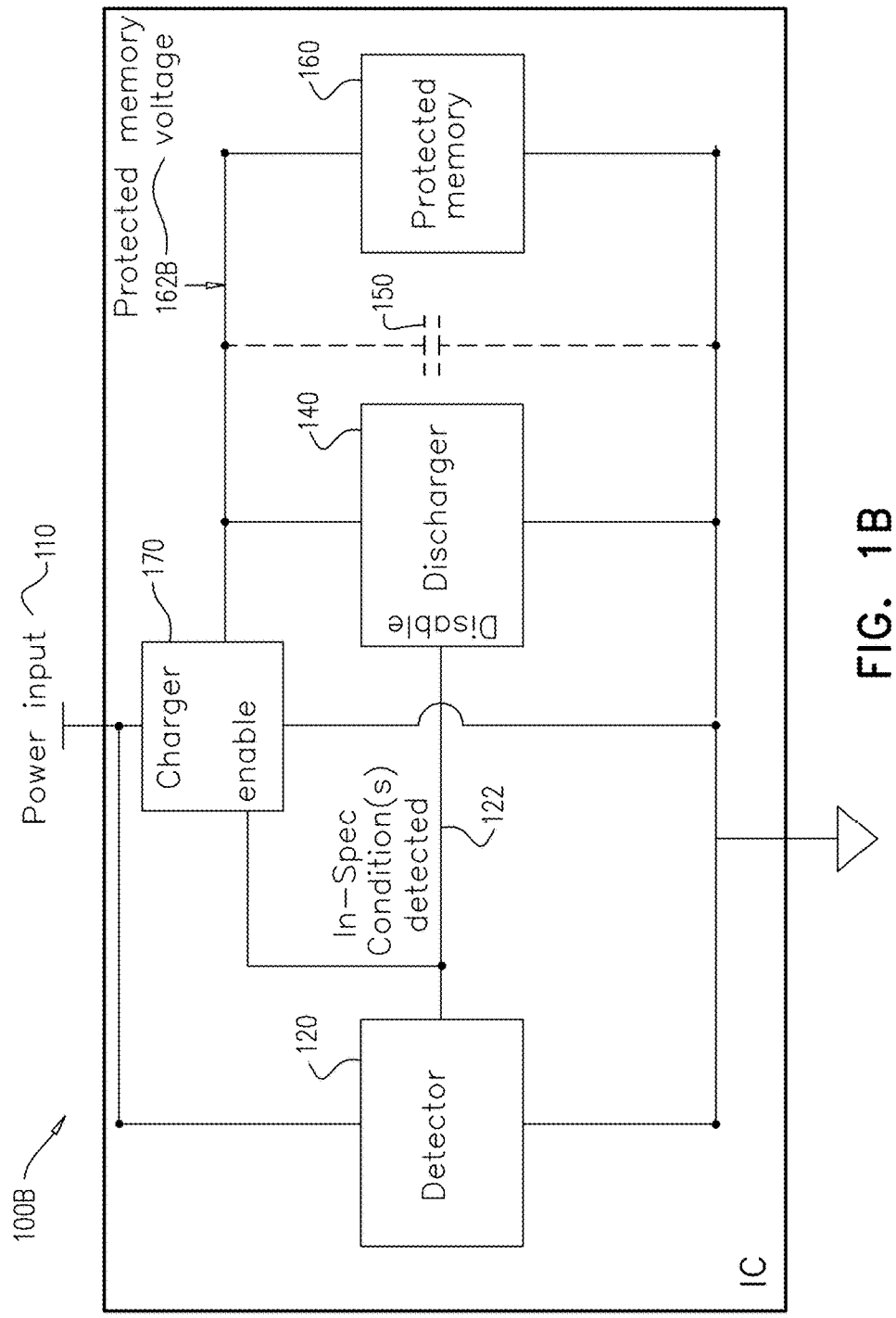

FIGS. 1A and 1B, respectively illustrate integrated circuit 100A and 100B, in accordance with some embodiments of the present disclosure. Elements which are similar but which may possibly (although not necessarily) have some variation among these figures are labelled with the same reference number followed by different letters. When referring to the element regardless of possible variation, only the reference number is used. For example integrated circuit 100 may refer to integrated circuit 100A or 100B.

In the illustrated embodiment, integrated circuit 100 may include a detector 120, a discharger 140, and a protected block of volatile memory 160. Volatile memory 160 is termed herein "protected" because data in the volatile memory 160 may be considered to be protected by the protection mechanism(s) in accordance with some embodiments of the present disclosure that will be described herein. A power source external to integrated circuit 100 may supply power to the integrated circuit 100 via power input 110. This supplied power may affect a voltage 162 (also referred to herein as "protected memory voltage", "internal voltage", "internal $V_{CC}$" and variants thereof) that is across volatile memory 160. The subject matter does not limit the type and level of the power source that supplies integrated circuit 100, and the type and level of the power source may vary depending on the implementation.

Volatile memory 160 may include a plurality of memory cells. The number and type(s) of memory cells included in volatile memory are not limited herein, but for the sake of further illustration some examples are now given. For example, in some cases volatile memory 160, may include few memory cells (say 5-20), whereas in some other cases volatile memory may include many memory cells (say millions of memory cells). Depending on the embodiment, volatile memory 160 may include only one type of memory cells or memory cells of different types. The type or types of volatile memory cells included in volatile memory 160 may include, for example, random access memory "RAM" (e.g. SRAM, DRAM, etc.) or any other volatile memory such as flip-flops. For simplicity's sake it is assumed that as long as there is a voltage that is at least equal to a "data erasure voltage" across volatile memory 160, data in volatile memory 160 may be retained. Once the voltage has dropped below the data erasure voltage for at least a minimal period of time, the correlation between the original stored data and any actual stored data may be lost or reduced.

Depending on the embodiment, integrated circuit 100 may or may not also include non-volatile memory. Any non-volatile memory which may be in integrated circuit 100 is ignored in the discussion below, for simplicity's sake. Additionally or alternatively, integrated circuit 100 may or may not include additional volatile memory that is not protected by the protection mechanism(s) in accordance with some embodiments of the present disclosure. For simplicity's sake, any memory which may be in integrated circuit 100 that is not so protected is ignored in the discussion below.

In the illustrated embodiment, FIG. 1B differs from FIG. 1A in that integrated circuit 100B of FIG. 1B includes a "charger" 170, whereas integrated circuit 100A of FIG. 1A does not include a charger. In FIG. 1B, the power that is supplied to integrated circuit 100B may be provided to charger 170. Charger 170 may in turn provide (or not provide) voltage for powering volatile memory 160. Examples of charger 170 may include a power regulator or a switch. The voltage across the output of charger 170 may not necessarily be equal to the voltage across the input of charger 170. For example, even if there is no impact from other elements in integrated circuit 100B on the voltage across the output of charger 170, the voltage across the output of charger 170 may be equal, higher, or lower that than the voltage across the input of charger 170. Therefore in embodiments where charger 170 is included in integrated circuit 100B, the power that is supplied to integrated circuit 100B may affect voltage 162B that is across volatile memory 160, by way of charger 170. It is noted that although the voltage is labeled 162B in FIG. 1B, it is possible that the voltage may be the same as voltage 162A in FIG. 1A.

In the illustrated embodiment of FIG. 1B, charger 170 is shown positioned inside integrated circuit 100. For instance, charger 170 may be connected, for example to power input 110 and to volatile memory 160. However, the subject matter does not limit the arrangement of charger 170 with respect to power input 110 and volatile memory 160 as long as charger 170 is positioned so as to influence how the supplied power may affect voltage 162 that is across volatile memory 160. More details on charger 170 are provided further below.

In the illustrated embodiment, integrated circuit 100 may have an associated capacitance, quantifying the ability of integrated circuit 100 to store electric charge (also referred to herein simply as "charge"). This capacitance associated with integrated circuit 100 may be due to capacitor(s) and/or other energy storing component(s) in integrated circuit 100 such as capacitor(s) and/or other energy storing component (s) in volatile memory 160, capacitor(s) and/or other energy storing component(s) in charger 170, capacitor(s) and/or other energy storing component(s) in any other element(s) of integrated circuit 100, intrinsic capacitance of any element (s) of integrated circuit 100, wiring, etc. At least part of this stored charge may affect voltage 162 that is across volatile memory 160, additionally or alternatively to the effect from the supplied power (possibly by way of charger 170). For simplicity's sake, in the illustrated embodiment, capacitance relating to stored electric charge which may affect the voltage 162 that is across volatile memory 160 is represented in the figures by a capacitor 150 drawn in dashed lines, (and therefore, stored charge that may affect voltage 162 is represented herein as being stored in capacitor 150, for simplicity's sake). It is noted that although capacitor 150 is shown as being external to volatile memory 160, at least part of the stored charge that may affect voltage 162 that is across volatile memory 160, may be stored within the intrinsic capacitance of volatile memory 160. The value of the capacitance represented by capacitor 150 may vary depending on the implementation, e.g., depending on the number and type(s) of memory cells in volatile memory 160, makeup of charger 170, etc.

Discharger 140 may be an example of a mechanism that protects volatile memory 140, in accordance with some embodiments of the present disclosure, as discharger 140 may be operative to discharge electric charge stored in integrated circuit 100, including electric charge stored in volatile memory 160. (The word "to" is sometimes used in this application, as an abbreviation for "operative to"). For example, discharger may be operative to discharge stored charge represented in the figures as being stored in capacitor 150. It should be understood that when referring herein to discharging stored electric charge, not all stored electric charge is necessarily indicated. More specifically, discharger 140 may not necessarily be operative to discharge all electric charge stored in integrated circuit 100, nor all electric charge stored in volatile memory 160. Discharger 140 may at least include one or more active element(s) of any suitable type(s). Discharger 140 may be digital or may be analog.

In the illustrated embodiment, discharger 140 may be operative to discharge (or not discharge) electric charge stored in integrated circuit, depending on an output of detector 120. When not discharging, the discharger may have substantially no effect on voltage 162 across volatile memory 160, but when discharging, discharger 140 may affect voltage 162 that is across volatile memory 160. The discharge duration is the duration during which discharger 140 may discharge stored charge after an output of detector 120 changes from a value that disables discharge to a value that enables discharge. The discharge duration may vary depending on the implementation of integrated circuit 100 and/or actual functioning of integrated circuit 100 (e.g., length of time that the output of detector 120 stays at the value that enables discharge, type of discharger 140, type(s) and number of cells in volatile memory 160, capacitance represented by capacitor 150, whether or not charger 170B is included in integrated circuit 100, etc.)

Depending on the embodiment, the (discharge) duration and the amount of charge, if any, that remains after the discharge duration may or may not be acceptable for the embodiment. The disclosure does not limit what is an acceptable duration or acceptable remaining charge, but for the sake of further illustration some examples are now provided. For example, a discharge duration may be acceptable if within this duration, voltage 162 across memory 160 is decreased to a level below the data erasure voltage and this duration is shorter than the time it would take for an (attack) technique to access data in volatile memory 160. In another example, the discharge duration may be acceptable if the discharge duration plus the time it may take for charge remaining after the discharge duration to leak so that the voltage 162 is decreased below the data erasure voltage, is shorter than the time it would take for an (attack) technique to access data in volatile memory 160.

In some examples of integrated circuit 100, it is possible that charger 170 may not be included in integrated circuit 100, or may be included in integrated circuit 100 but not coupled to detector 120, meaning that the charger may operate normally regardless of an output of detector 120. In these examples, during the discharging by discharger 140, the rate that the stored charge decreases may vary depending on the example. For example, the rate that the stored charge decreases may be the same as would be the case if normal operation of charger 170 were instead disabled; the rate that the stored charge decreases may be lower than would be the case if normal operation of charger 170 were instead disabled; the stored charge may remain the same; or the stored charge may increase, despite the discharging by discharger 140. The rate of decrease may be the same as would be the case if normal operation of charger 170 were instead disabled, for instance, if no power is supplied to integrated circuit 100 via power input 110, and therefore charger 170 may not provide a positive voltage even under normal operation. However, in the other examples, the discharge duration may lengthen compared to embodiments where normal operation of charger 170 is instead disabled. Such a lengthened discharge duration may or may not be acceptable as discussed in the paragraph above.

Regarding how much remaining charge, if any, after the discharge duration may be acceptable, in various examples, the acceptable amount may be none; may be an amount that discharger 140 is not operative to discharge (e.g., due to threshold voltage or cut-off voltage of elements thereof); may be an amount corresponding to voltage 162 being below the data erasure voltage; may be an amount that may be expected to leak so that the voltage 162 is decreased below the data erasure voltage, before an attacker may access data in memory 160; or may be an amount that may be acceptable for any other reason.

In the illustrated embodiment, discharger 140 is shown positioned outside of the volatile memory 160, or in other words external to volatile memory 160. For instance, discharger 140 may be connected to volatile memory 160, possibly in parallel to volatile memory 140. However, the disclosure does not limit the arrangement of discharger 140 with relation to volatile memory 160, as long as discharger 140 is external to volatile memory 160 and positioned in a manner which allows discharger 140 to discharge, when appropriate, electric charge stored in volatile memory 160.

Detector 120 may be operative to detect one or more conditions. For instance, the condition(s) may relate to parameter(s) for integrated circuit 100 and the proper functionality thereof. The parameter(s) to which the condition(s) may relate are not limited herein, but for the sake of further illustration, some examples are now provided. Examples of parameter(s) may include voltage difference between two points in integrated circuit 100, voltage (e.g. voltage supplied to integrated circuit 100), clock rate, (operating) temperature, current, power, light absorption, radiation absorption, etc. Continuing with this instance, in some cases, the detected condition(s) may include in-specification condition(s) for the parameter(s) that allow a correct operation of integrated circuit 100. In-specification condition(s) may be detected when the actual value(s) of such parameter(s) may ensure correct operation of integrated circuit 100, due to being within specification for integrated circuit 100, whereas in-specification condition(s) may not be detected when the actual value(s) of such parameter(s) may not ensure correct operation of integrated circuit 100, due to being outside of specification for integrated circuit 100. Outside specification condition(s) may therefore be inferred by not detecting within-specification condition(s). In this instance, unless the in-specification condition(s) are detected, protection mechanism(s) in accordance with the subject matter may be activated as described herein. Depending on the embodiment, actual value(s) of parameter(s) may be inferred as being outside specification, soon after or not soon after the actual values of the parameter(s) stray outside of specification, and thereby may or may not provide a (presumably) timely discovery of this event.

When stating herein that a parameter is outside (or out of, or not within) specification for integrated circuit 100, it should be understood that the actual value of the parameter may be out of specification for integrated circuit 100 (as a whole) and/or may be out of specification for any one or more element(s) included in integrated circuit 100, such as for detector 120, discharger 140, charger 170 and/or memory 160. Similarly, a parameter being within specification for integrated circuit 100 may mean that the actual value of the parameter may be within specification for integrated circuit 100 (as a whole) and/or may be within specification for any one or more element(s) included in integrated circuit 100. For example, an in-specification condition for a parameter may include the parameter being within a predetermined range that includes the nominal value of the parameter. Detector 120 may in this example compare the actual value of the parameter to the upper and/or lower boundary/ies of the range that includes the nominal value of the parameter (e.g., in the center of the range). The nominal value of a parameter may be the value specified for the parameter by a specification of a manufacturer (e.g., manufacturer of integrated circuit 100, of element(s) included in integrated circuit 100). The lower boundary of a range may be the minimum value that is specified which substantially guarantees a proper functionality of integrated circuit 100. The upper boundary of a range may be the maximum value that is specified which substantially guarantees a proper functionality of integrated circuit 100.

It is noted that non-detection of at least one of the one or more in-specification conditions may not necessarily be due to an attack by an attacker on integrated circuit 100. For example, detection of the in-specification condition(s) may fail for any reason. However, in some cases, non-detection of a particular in-specification condition may point to a certain type of attack. Moreover, in some of these cases, the in-specification condition(s) to be detected may be selected based on attack(s) that is/are of interest to detect. For instance, detection of in-specification voltage may be selected, if a Brown Out Event attack is of interest. The disclosure is not bound by any particular type of attack, and the type(s) of attack that may be identified by detection of one or more conditions may vary depending on the embodiment. Moreover, possible way(s) of detecting a particular attack are not limited herein.

In the illustrated embodiment, discharger 140 may be operative to discharge unless detector 120 detects the one or more in-specification conditions, for example discharger 140 may be operative to discharge unless an output 122 of detector 120 is indicative that the one or more conditions is detected. Detector 120 may not detect at least one of the one or more in-specification conditions if, for at least one parameter, the parameter is not within a predetermined range that includes a nominal value of the parameter for integrated circuit 100. Additionally or alternatively, detector 120 may not detect at least one of the one or more in-specification conditions if no power or insufficient power for power detection is provided to detector 120.

In the illustrated embodiment, detector 120 is shown operative to provide an output 122, indicative that the one or more in-specification condition(s) is detected, that may disable discharger 140 from discharging. However, in some embodiments, detector 120 may additionally or alternatively provide an output indicative that the one or more in-specification conditions is detected, that may be adapted in discharger 140 or between detector 120 and discharger 140, so that the adapted output may disable discharger 140 from discharging when the one or more in-specification conditions is detected.

In the illustrated embodiment, detector 120 is shown connected to discharger 140, without any additional element(s) in between. However, in some embodiments, detector 120 may not necessarily be directly connected to discharger 140 (see for example discussion of FIG. 4A, 4B, or 5B below). Therefore, when stating that detector 120 is coupled to discharger 140 it should be understood that the coupling may not necessarily include a direct connection or even a wired connection.

In some embodiments of integrated circuit 100B, charger 170 may be included solely in order to provide a protection mechanism for volatile memory 160 in accordance with these embodiments of the present disclosure. However, in some other embodiments of integrated circuit 100B, charger 170 may be included not only for protection of volatile memory 160. For instance, charger 170 may be included when the voltage 162B has to be regulated to a lower voltage relative to the voltage input at power input 110, thereby acting as a power regulator. The functionality of power regulation may be useful, for example, for an integrated circuit that is in a smartcard. Even if charger 170 has other useful functionality, the coupling between detector 120 and charger 170 may protect the volatile memory 160 in accordance with some embodiments of the present disclosure. It is noted that for simplicity of description, it is assumed herein that if charger 170 is included in integrated circuit 100, charger 170 is coupled to detector 120, but it is possible that in some embodiments, charger 170 may be included but not so coupled, as discussed above. The term charger is used herein for element 170 because charger 170 may be operative to cause charge to be stored in integrated circuit 100, for example represented as stored in capacitor 150.

In the illustrated embodiment of integrated circuit 100B, the enabling or disabling of normal operation of charger 170 may depend on an output of detector 120. Normal operation of charger 170 may mean the way charger 170 would have operated if not affected by detection or non-detection of in-specification condition(s) by detector 120, for instance because of not being coupled to detector 120. In some examples, (as illustrated in FIG. 1B) if detector 120 detects the in-specification condition(s), for example if an output of detector 120 is indicative that the in-specification condition(s) being detected, normal operation of charger 170 may be enabled. During normal operation, charger 170 may be operative to provide positive voltage for powering volatile memory 160 as long as a power source that is external to integrated circuit 100 is supplying power to integrated circuit 100 (e.g., via power input 110). Otherwise, normal operation of charger 170 may be disabled. When normal operation is disabled, charger 170 may act as an open switch that does not affect protected voltage 162B. Charger 170 may thus be an example of a mechanism that protects volatile memory 160, in accordance with some embodiments of the present disclosure, because normal operation may be disabled.

In the illustrated embodiment of FIG. 1B, detector 120 is shown operative to provide an output 122, indicative that the one or more in-specification conditions is detected, that enables normal operation of charger 170. However, in some embodiments, detector 120 may additionally or alternatively provide an output indicative that the one or more in-specification conditions is detected, that may be adapted in charger 170 or between detector 120 and charger 170, so that the adapted output may enable charger 170 if the one or more in-specification conditions is detected.

In the illustrated embodiment of FIG. 1B, detector 120 is shown connected to charger 170, without any additional element(s) in between. However, in some embodiments, detector 120 may not necessarily be directly connected to charger 170. (See for example, discussion of FIG. 8A or 8C below.) Therefore, when stating that detector 120 is coupled to charger 140 it should be understood that the coupling may not necessarily include a direct connection or even a wired connection.

In the illustrated embodiment of integrated circuit 100B in FIG. 1B, the same output 122 from detector 120 that is indicative of one or more in-specification conditions being detected may enable normal operation of charger 170 and disable discharger 140 from discharging. Similarly, if output 122 from detector 120 is not indicative of the one or more in-specification conditions being detected, normal operation of charger 170 may be disabled and discharger 140 may discharge. However, in other embodiments different outputs from detector 120 may enable/disable normal operation of charger 170, and may disable/enable discharger 140 to discharge, respectively.

It is noted that discharger 140 may be operative to discharge unless detector 120 detects the one or more in-specification conditions. Similarly, charger 170 may be operative to provide positive voltage for powering volatile memory 160 only if a power source that is external to integrated circuit is supplying power to integrated circuit 100 (e.g., via power input 110) and detector 120 detects the one or more in-specification conditions. Detector 120 may fail to detect at least one of the one or more in-specification conditions, due to parameter(s) not being within predetermined range(s) that include nominal value(s) of the parameter(s) for integrated circuit 100 or due to no power or insufficient power being provided to detector 120 to perform detection. Elaborating on the latter reason, in the illustrated embodiment, detector 120 is shown powered by a power source external to integrated circuit 100, as detector 120 is shown connected to power input 110. However, in other embodiments, detector 120 may be powered by an internal power source (other than protected memory voltage 162), mutatis mutandis.

Some embodiments of integrated circuit 100 may be advantageous, in that if no power or insufficient power is provided to detector 120 to perform detection, detector 120 may provide an output which may cause, or whose adapted version may cause, discharger 140 to discharge electric charge stored in integrated circuit 100, and normal operation of charger 170 (if included) to be disabled. For example, discharger 140 may be operative to discharge (e.g., act as a closed switch) and/or normal operation of charger 170 may disabled (e.g., act as an open switch).

It is noted that FIGS. 1A and 1B, are provided as examples of an arrangement of the shown elements, but some embodiments may include other arrangements. It is also noted that in some embodiments, a particular integrated circuit 100 may include fewer, more and/or different elements than shown in FIGS. 1A and/or 1B. For instance, in some of these embodiments, additional elements in integrated circuit 100 may provide functionality unrelated to protection of memory 160. Additionally or alternatively, for instance, in some of these embodiments, additional elements in integrated circuit 100 may provide functionality that protects memory 160 in addition to the protection provided by discharger 140 and/or by charger 170. Continuing with this instance, there may, for example, be other protection mechanism(s) in a particular integrated circuit 100, in addition to discharger 140 and/or charger 170. Depending on the example, the other mechanism(s) may or may not be dependent on an output of detector 120. Other mechanism(s) may include, for example, a mechanism to overwrite data in volatile memory 160, a mechanism to move data in volatile memory 160, etc. In some embodiments, there may not necessarily be other protection mechanism(s) in a particular integrated circuit 100, in addition to discharger 140 and/or charger 170.

Figure 2:
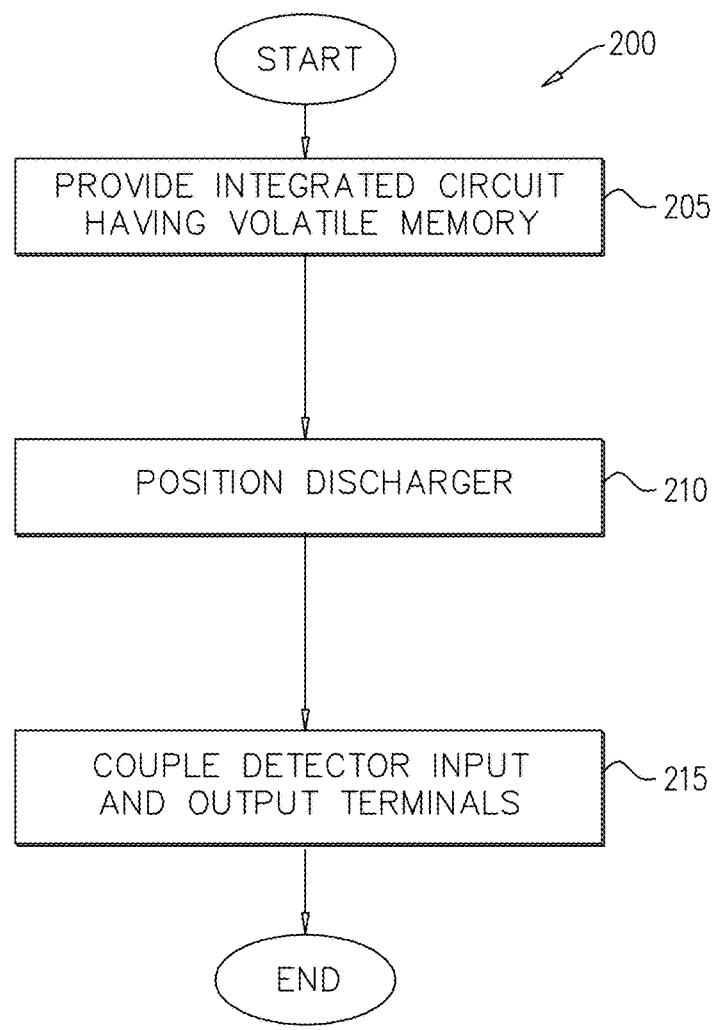
FIG. 2 is a flowchart of an exemplary method of producing an integrated circuit, in accordance with some embodiments of the present disclosure.

FIG. 2 is a flowchart of an exemplary method 200 of producing an integrated circuit such as integrated circuit 100, in accordance with some embodiments of the present disclosure. In stage 205 an integrated circuit 100 which includes volatile memory 160, and optionally charger 170 is provided. It is noted that for simplicity's sake, it is assumed that integrated circuit 100 that is provided in stage 205 already includes volatile memory 160 and is configured for any functionality unrelated to discharging and/or charging that is dependent on detection/non-detection of in-specification condition(s) by detector 120. However, in some embodiments, configuration for operations unrelated to discharging and optional disabling may occur during and/or after stages 210 and/or 215.

In stage 210, discharger 140 may be positioned external to volatile memory 160, within integrated circuit 100. The positioning of discharger 140 may allow discharger 140 to discharge, when appropriate, electric charge stored in integrated circuit 100, including electric charge stored in volatile memory 160.

In stage 215, input terminal(s) and/or output terminal(s) of detector 120 may be coupled appropriately. Detector 120 may be positioned in integrated circuit 100 at this stage or may have been previously positioned in integrated 100 circuit before provision in stage 205 so as to be operative to be powered by voltage supplied to integrated circuit 100, by power from an internal power source other than protected memory voltage 162, etc.

For instance, an output terminal of detector 120 may be coupled to discharger 140 so that an output or an adapted output of detector 120 may cause discharger 140 to discharge unless detector 120 detects the one or more in-specification condition(s). If charger 170 is included in integrated circuit 100, then depending on the embodiment, charger 170 may be positioned at this stage in integrated circuit 100 or may have been previously positioned in integrated 100 circuit before provision thereof in stage 205. Charger 170 may be positioned so as to be operative to be powered by the power supplied to integrated circuit 100 (e.g., via power input 110) and to provide positive voltage for powering volatile memory 160 only if power is being supplied to integrated circuit 100 and detector 120 detects the one or more in-specification conditions. The same or different output terminal of detector 120 may be coupled to charger 170 so that an output or an adapted output of detector 120 may cause normal operation of charger 170 to be disabled unless detector 120 detects the one or more in-specification condition(s).

Depending on the embodiment, input terminal(s) of detector 120 may be coupled at this stage or may have been coupled in integrated 100 circuit before provision of integrated circuit 100 in stage 205. In some embodiments, where condition(s) may relate to parameter(s) and/or reference value(s) (e.g., the upper and/or lower boundary/ies of the range that includes the nominal value of the parameter), input terminal(s) of detector 120 may be coupled appropriately for the parameter(s) and/or reference value(s). For example, assume the parameter(s) may include e.g., a voltage difference between two points in integrated circuit 100. In this instance, input terminal(s) for the reference value(s) may be coupled to one or two reference voltage source representing the upper boundary of the range that includes the nominal difference and/or the lower boundary of the range that includes the nominal difference, and input terminal(s) for parameter(s) may be coupled to the two points in integrated circuit 100. For another example, if the parameter(s) additionally or alternatively include temperature, clock rate, power, voltage, light absorption, radiation absorption, and/or current, etc. in integrated circuit 100, a person skilled in the art may design appropriate circuitry to check that the actual value(s) of the parameter(s) is within specification(s)

In some embodiments, stage(s) shown in FIG. 2 may be performed in a different order, and/or two or more stages may be performed simultaneously. Additionally or alternatively, in some embodiments, method 200 may include fewer, more and/or different stages than illustrated in FIG. 2.

As mentioned above, voltage 162 that is across volatile memory 160 may be affected by the power supplied to the integrated circuit, possibly by way of the charger 170, may be affected by stored electric charge, represented as being stored in capacitor 150, and/or may be affected by discharging by discharger 160 of stored electric charge that is represented in the figures as being stored in capacitor 150. In order to protect data in volatile memory 160, it may be desirable that the voltage 162 across volatile memory 160 be reduced unless detector 120 detects certain in-specification condition(s). It is noted that for volatile memory 160 to be considered protected, it may not be necessary for voltage 162 to be reduced to zero. For example, in the case that an attack of concern includes a laser scanning technique to access data in volatile memory 160, reducing voltage 162 by discharging to below the data erasure voltage may be enough to thwart such a technique. It may even be possible that discharging that reduces voltage 162 to a close level that is above the data erasure voltage (for example 0.2 v above the data erasure voltage) may be enough to thwart such a technique (as voltage 162 may further be reduced as a result of further discharging and/or leakage). Some embodiments of a method of protecting volatile memory that includes reducing voltage 162 will now be described.

Figure 3:
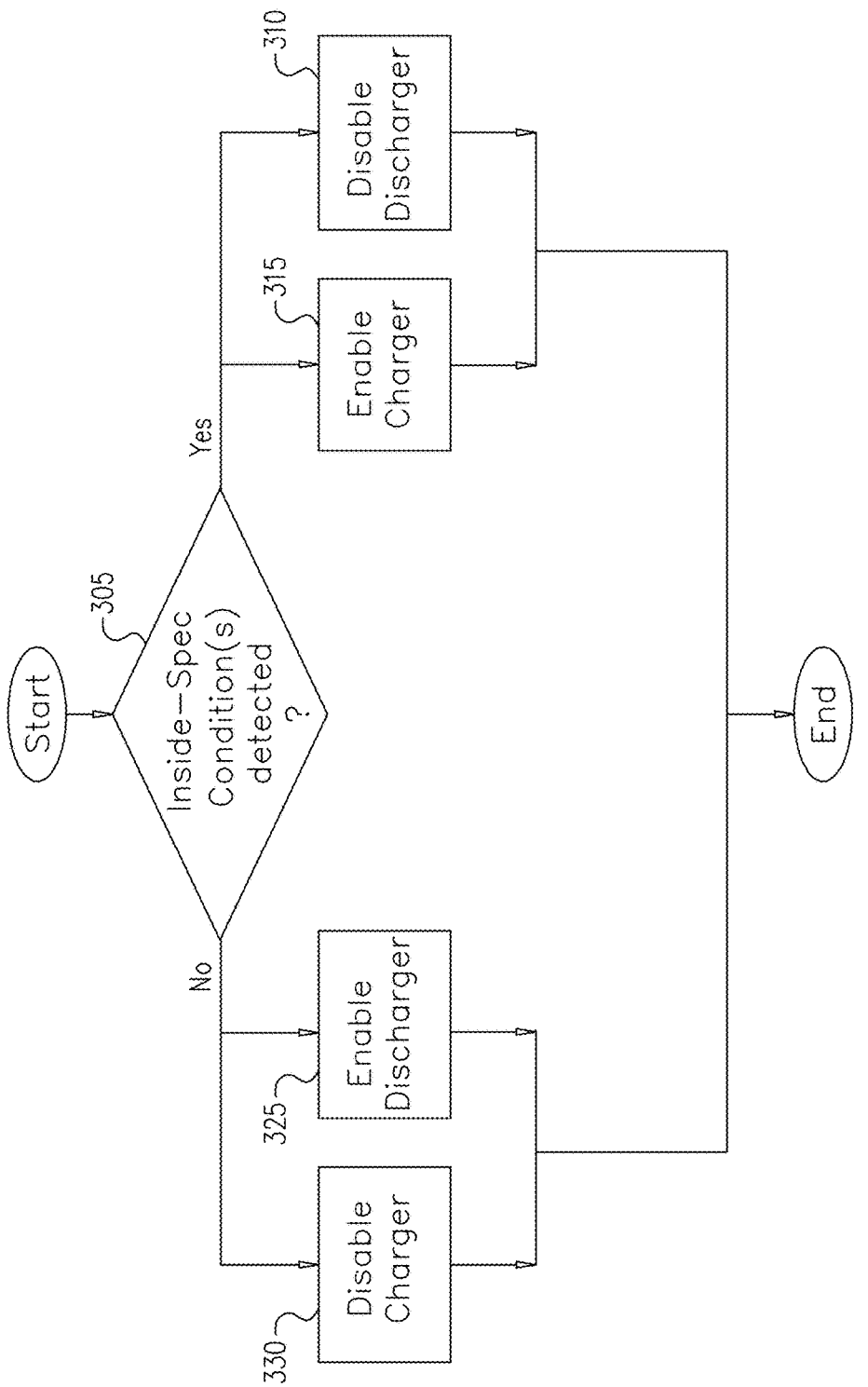
FIG. 3 is a flowchart of an exemplary method of protecting volatile memory in an integrated circuit, in accordance with some embodiments of the present disclosure.

FIG. 3 is a flowchart of an exemplary method 300 of protecting volatile memory in an integrated circuit such as integrated circuit 100, in accordance with some embodiments of the present disclosure. In stage 305, it may be determined whether or not the one or more in-specification conditions is detected. For instance, detector 120 may detect one or more in-specification conditions, or may not detect at least one of the one or more in-specification conditions. In stage 310, if determined that the in-specification condition(s) is detected, discharger 130 may be disabled from discharging stored charge. Optionally, in stage 315, if determined that the in-specification condition(s) is detected, normal operation of charger 170 may be enabled, so that charger 170 may supply positive voltage to power volatile memory 160, provided that integrated circuit 100 is being supplied with power. As a result, protected voltage 162 may be in accordance with normal operation of charger 170, e.g., approximately equal to the voltage inputted to charger 170 if charger 170 is a switch or e.g., regulated normally by charger 170 if charger 170 is a power regulator. Alternatively, in stage 305, it may be determined that at least one of the one or more in-specification conditions is not detected (e.g., due to at least one parameter not being within a respective predetermined range which includes a respective nominal value of the parameter, and/or due to no power or insufficient power to perform detection being provided to detector 120). Based on the determination, in stage 325, discharger 130 may discharge stored electric charge, as discussed above with reference to FIGS. 1A and 1B. Optionally, in stage 330, based on the determination, normal operation of charger 170 may be disabled, so that charger 170 does not supply a positive voltage for powering volatile memory 160, as discussed above with reference to FIGS. 1A and 1B. In this case, due to the discharging and optionally the disabling of normal charger operation, voltage 162 across volatile memory 160 may be reduced. For example, voltage 162 may be reduced (e.g., due to discharging and/or leakage) to below a data erasure voltage.

In some embodiments, stage(s) shown in FIG. 3 may be performed in a different order; two or more stages that are shown as being performed sequentially may be performed simultaneously; and/or two or more stages that are shown as being performed in parallel may be performed sequentially. Additionally or alternatively, in some embodiments, method 300 may include fewer, more and/or different stages than illustrated in FIG. 3.

Now will be described more details regarding certain embodiments of integrated circuit 100. Referring to FIG. 4A, FIG. 4B, FIGS. 5A, and 5B, FIG. 4A, 4B, 5A or 5B illustrate an example of a discharger 440A, 440B, 540A, or 540B positioned in an integrated circuit 400A, 400B, 500A, or 500B, respectively in accordance with some embodiments of the present disclosure. Any item in FIG. 4A, 4B, 5A, or 5B that is labeled in the format of 4xy or 5xy (where x, y are digits that may or may not be the same) may be an example of an item labeled 1xy in FIGS. 1A and/or 1B. The illustrated embodiment of FIG. 4A, 4B, 5A, or 5B may include a charger 470 or 570 that is a power regulator. These embodiments may also include a detector 420 or 520 operative to at least detect an in-specification voltage at $V_{CC}$ 410 or 510 and to provide a single output (at a single output terminal), which, unless an in-specification voltage at $V_{CC}$ 410 or 510 is detected, causes a discharger 440 or 540 to discharge and a charger 470 or 470 to be disabled. However, as discussed above, other embodiments are possible which may exclude a charger (or may include a different type of charger such as a switch), may include a plurality of outputs and/or a plurality of output terminals for detector 420 and/or 520, may include in-specification condition(s) related to other parameter(s) in addition to or instead of $V_{CC}$, etc.

The illustrated embodiment of FIG. 4A, 4B, 5A or 5B show detector 420 or 520 as being powered by VCC 410 or 510, but in other embodiments, detector 420 and/or 520 may be powered from an internal power source other than internal VCC 462 and/or 562. For simplicity's sake, a single transistor 440A, 440B, 540A or 540B is described and illustrated in each of FIGS. 4A, 4B, 5A, and 5B, but it should be understood that reference to a transistor in the single form may cover embodiments with a single transistor and embodiments with a plurality of transistors. The power entering integrated circuit 400A, 400B, 500A or 500B at VCC 410 or 510 may be inputted into power regulator 470 or 570.

Figure 4A:
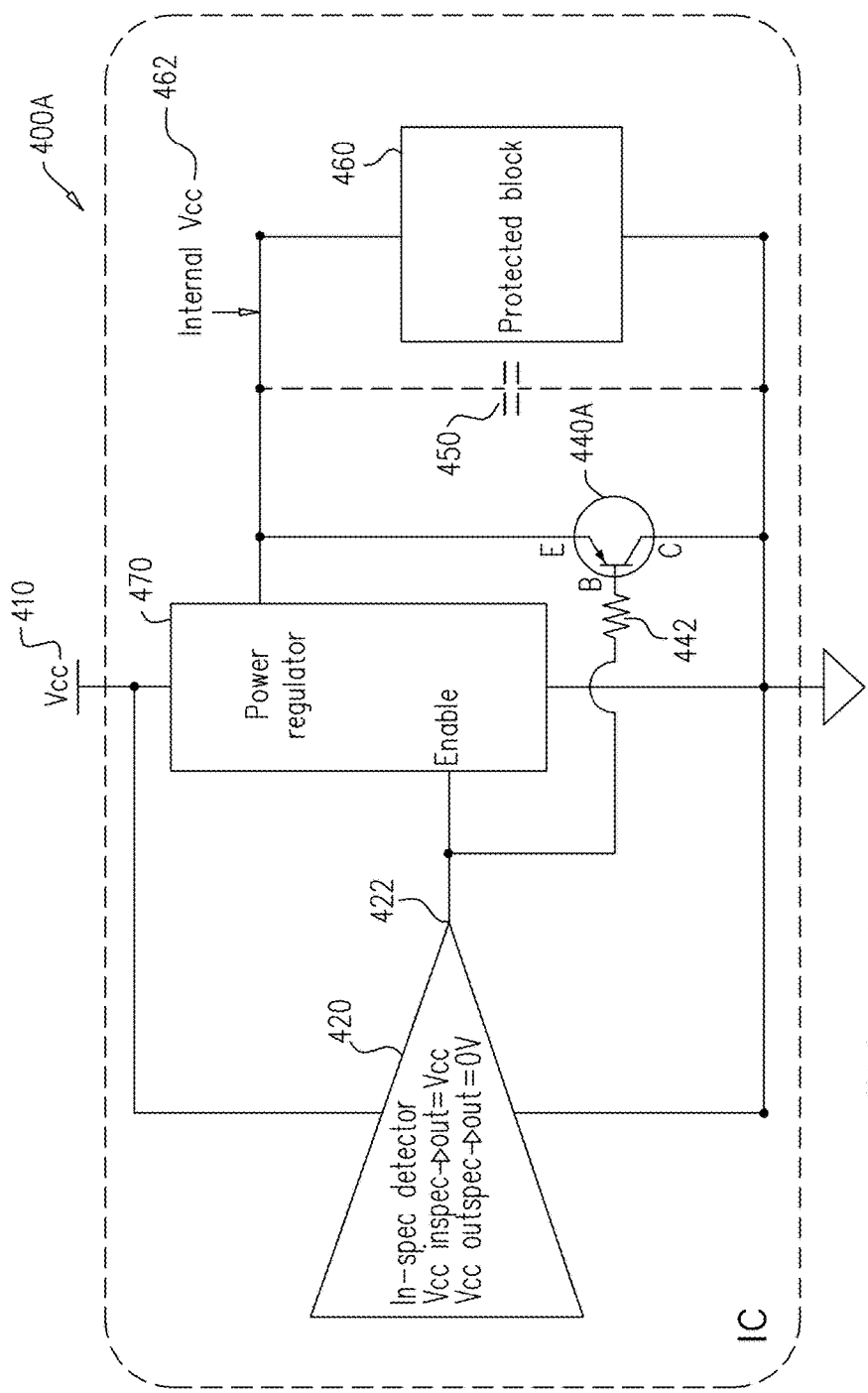
FIGS. 4A, 4B, 5A, and 5B are schematic illustrations of a discharger positioned in an integrated circuit, in accordance with some embodiments of the present disclosure.

In FIG. 4A, an output terminal of power regulator 470 may be connected to an emitter ("E") of bi-polar PNP transistor 440A functioning as a discharging element, and to a volatile memory 460. The collector ("C") of transistor 440A, and volatile memory 460 may be connected to ground. (Therefore it may be stated that transistor 440A may be connected to volatile memory 460.) An output terminal of detector 420 may be considered to be coupled to the base ("B") of transistor 440A, as the output terminal of detector 420 may be connected to resistor 442 in series with the base of transistor 440A.

PNP transistor 440A may behave as a closed switch (discharging stored charge) when the base terminal voltage is lower than the emitter terminal voltage and the absolute value of the voltage difference between the base and the emitter of the transistor, i.e. $|V_{BE}|$, is higher than the cut-off voltage of this transistor. Otherwise, transistor 440A may act as an open switch (and not discharge stored charge).

When $V_{CC}$ 410 is within specification, detector 420 may set output 422 to a high value (e.g., approximately equal to the voltage at $V_{CC}$ 410) as an indication of in-specification condition detection. Since the absolute value of $V_{BE}$ is not higher than the cut-off voltage, transistor 440A may act as an open switch and not discharge stored charge.

On the other hand, when $V_{CC}$ 410 is not within specification, or detector 420 fails to detect the in-specification condition for any other reason, the detector output 422 may be set to a low value (e.g., approximately 0 volts) as an indication of in-specification condition non-detection. Since the base terminal voltage is lower than the emitter terminal voltage and the absolute value of $V_{BE}$ is higher than the cut-off voltage, transistor 440A may act as a closed switch and may discharge stored charge, until internal $V_{CC}$ 462 drops below the cut-off voltage of transistor 440A.

Figure 4B:
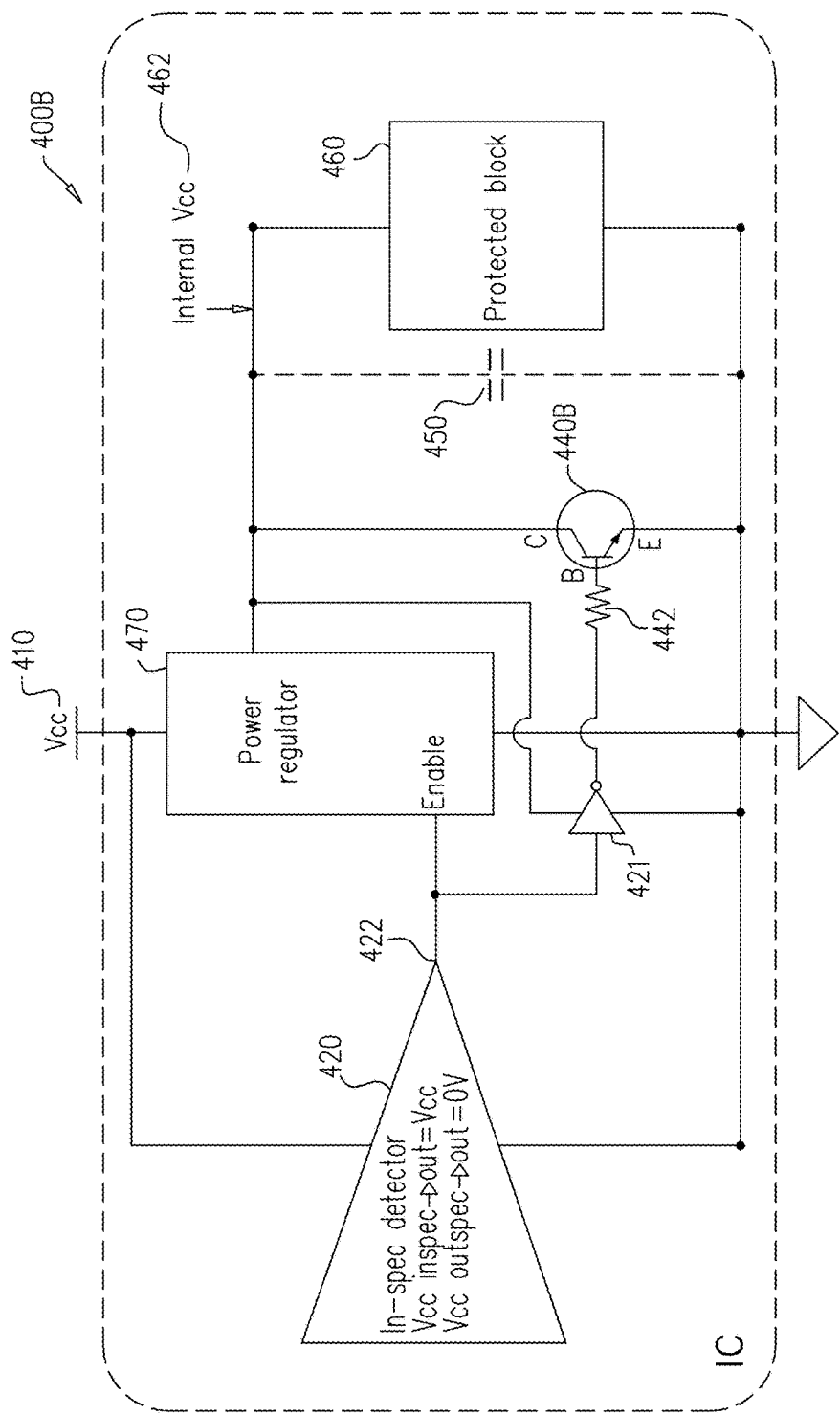

Similarly in FIG. 4B, an output terminal of power regulator 470 may be connected to a collector ("C") of bi-polar NPN transistor 440B functioning as a discharging element, and to a volatile memory 460. The emitter ("E") of transistor 440B, and volatile memory 460 may be connected to ground. (Therefore it may be stated that transistor 440B may be connected to volatile memory 460.) An output terminal of detector 420 may be considered to be coupled to the base ("B") of transistor 440/B, as the output terminal of detector 420 may be connected to a NOT-gate 421 and a resistor 442 in series with the base of transistor 440B, where NOT-gate 421 is powered from internal $V_{CC}$ 462.

NPN transistor 440B may behave as a closed switch (discharging stored charge) when the base terminal voltage is higher than the emitter terminal voltage and the value of the voltage difference between the base and the emitter of the transistor, i.e. VBE, is higher than the cut-off voltage. Otherwise, transistor 440B may act as an open switch (and not discharge stored charge).

When $V_{CC}$ 410 is within specification, detector 420 may set output voltage 422 to a high value (e.g., approximately equal to the voltage at $V_{CC}$ 410) as an indication of in-specification condition detection, and the voltage at the output of NOT-gate 421 as well as the base terminal voltage of transistor 440B may consequently be set to a low value (e.g., approximately 0 volts). Since $V_{BE}$ of transistor 440B is lower than the cut-off voltage, transistor 440B may act as an open switch and not discharge stored charge.

On the other hand, when $V_{CC}$ 410 is not within specification, or detector 420 fails to detect the in-specification condition for any other reason, the detector output voltage 422 voltage may be set to a low value (e.g., approximately 0 volts) as an indication of in-specification condition non-detection, and consequently the voltage at the output of NOT-gate 421 as well as the base terminal voltage of transistor 440B may be approximately set to the level of internal $V_{CC}$ 462. Since $V_{BE}$ of transistor 440B is higher than the cut-off voltage, transistor 440B may act as a closed switch and discharge stored charge, until internal $V_{CC}$ 462 drops below approximately the cut-off voltage of transistor 440B.

Figure 5A:
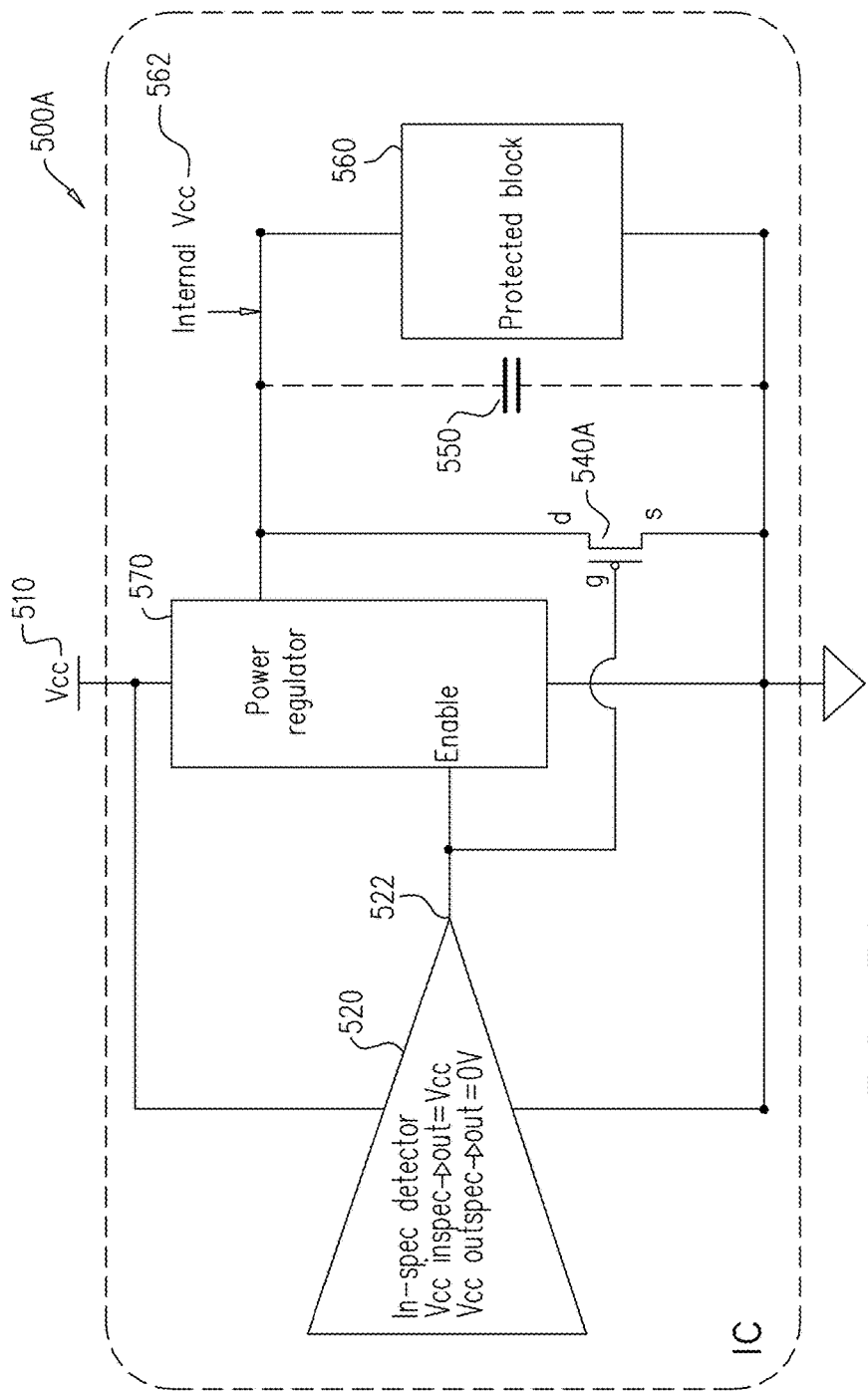

In FIG. 5A, an output terminal of power regulator 570 may be connected to the source ("s") of a pMOSFET ("p-mos") transistor 540A functioning as a discharging element, and to a volatile memory 560. The drain ("d") of transistor 540A, and volatile memory 560 may be connected to ground. (Therefore it may be stated that transistor 540A may be connected to volatile memory 560.) The gate ('g') of transistor 540A may be coupled to an output terminal 522 of detector 520.

P-mos transistor 540A may behave as a closed switch (discharging stored charge) when the gate terminal voltage is lower than the source terminal voltage and the absolute value of the voltage difference between the gate and the source of the transistor, i.e. $|V_{GS}|$, is higher than the threshold voltage. Otherwise, transistor 540A may act as an open switch (and not discharge stored charge).

When $V_{CC}$ 510 is within specification, detector 520 may set output voltage 522 to a high value (e.g., approximately equal to the voltage at $V_{CC}$ 510) as an indication of in-specification condition detection. Since the gate terminal voltage is not lower than the source terminal voltage, transistor 540A may act as an open switch and not discharge stored charge.

On the other hand, when $V_{CC}$ 510 is not within specification, or detector 520 fails to detect the in-specification condition for any other reason, the detector output 522 voltage (connected to the gate terminal of transistor 540A) may be set to a low value (e.g., approximately 0 volts) as an indication of in-specification condition non-detection. Since the gate terminal voltage of transistor 440A is lower than the source terminal voltage and the absolute value of $V_{GS}$ is higher than the threshold voltage, transistor 540A may discharge stored charge, until internal $V_{CC}$ 562 drops below approximately the threshold voltage of transistor 540A.

Figure 5B:
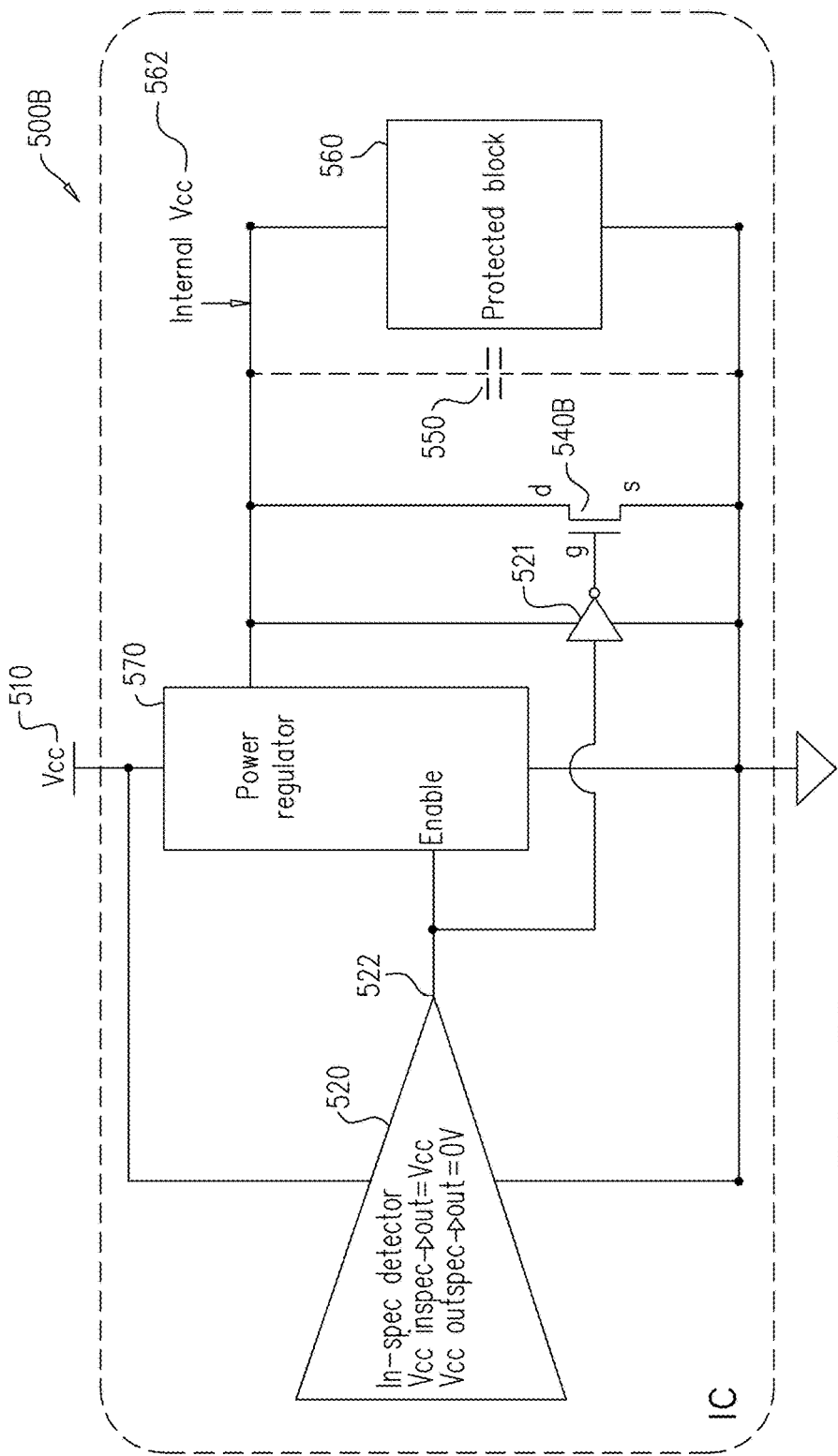

Similarly in FIG. 5B, an output terminal of power regulator 570 may be connected to the drain ("d") of an nMOSFET ("n-mos") transistor 450B functioning as a discharging element, and to volatile memory 560. The source ("s") of transistor 540B, and volatile memory 560 may be connected to ground. (Therefore it may be stated that transistor 540B may be connected to volatile memory 560.) The gate ('g') of transistor 540B may be considered to be coupled to an output terminal of detector 520, as the output terminal of detector 520 may be connected to a NOT-gate 521 in series with the gate of transistor 540B, where NOT-gate 521 is powered from internal $V_{CC}$ 562.

N-mos transistor 540B may behave as a closed switch (discharging stored charge) when the gate terminal voltage is higher than the source terminal voltage and the value of the voltage difference between the gate and the source of the transistor, i.e. $V_{GS}$, is higher than the threshold voltage. Otherwise, transistor 540B may act as an open switch (and not discharge stored charge).

When $V_{CC}$ 510 is within specification, detector 520 may set output voltage 522 to a high value (e.g., approximately equal to the voltage at $V_{CC}$ 510) as an indication of in-specification condition detection, and the voltage at the output of NOT-gate 521 as well as the gate terminal voltage of transistor 540B may consequently be set to a low value (e.g., approximately 0 volts). Since $V_{GS}$ of transistor 540B is not higher than the threshold voltage, transistor 540B may act as an open switch and not discharge stored charge.

On the other hand, when $V_{CC}$ 510 is not within specification, or detector 520 fails to detect the in-specification condition for any other reason, the detector output voltage 522 may be set to a low value (e.g., approximately 0 volts) as an indication of in-specification condition non-detection, and the voltage at the output of the NOT-gate 521 as well as the gate terminal voltage of transistor 540B may consequently be approximately set to internal $V_{CC}$ 562. Since $V_{GS}$ of transistor 540B is higher than the threshold voltage, transistor 540B may act as a closed switch and discharge stored charge, until internal $V_{CC}$ 562 drops below the threshold voltage of transistor 440B.

In the illustrated embodiment of FIG. 4A or FIG. 4B the remaining internal $V_{CC}$ voltage level at the end of the discharge process may depend on the cut-off value of discharge transistor 440A or 440B. The lower the cut-off value is, the lower the remaining voltage may be. Similarly, in the illustrated embodiment of FIG. 5A or FIG. 5B the remaining internal $V_{CC}$ voltage level at the end of the discharge process may depend on the threshold value of discharge transistor 540A or 540B. The lower the threshold value is, the lower the remaining voltage may be. Consequently, it may be desirable in some cases that transistor 440A, 440B, 540A or 540B have a low cut-off or threshold voltage. For example, in some of these cases, the discharge transistor that is selected for transistor 440A, 440B, 540A, or 540B may have a cut-off voltage or threshold voltage below the data erasure voltage, so that voltage 462 or 562 may be less than the data erasure voltage at the end of the discharge process. Additionally or alternatively, in some of these cases, the transistor that is selected for transistor 440A, 440B, 540A, or 540B may have a cut-off voltage or threshold voltage that is close enough to the data erasure voltage so that leakage may lead to voltage 462 or 562 becoming less that the data erasure voltage.

The subject matter does not require that discharger 140 of FIGS. 1A and 1B have the features of transistor 440A, 440B, 540A, or 540B described with reference to FIG. 4A, 4B, 5A or 5B. Discharger 140 may be made up of any type(s) and number of discharging component(s). As mentioned above, discharger 140 may be digital or may be analog. Discharger 140 may at least include one or more active element(s) of any suitable type(s). If discharger 140 includes transistor(s), any number and type(s) of transistor(s) may be used, as appropriate to the implementation, and not necessarily transistor 440A, 440B, 540A, or 540B. Furthermore, the subject matter is not bound by the elements nor by the arrangement of elements shown in FIG. 4A, 4B, 5A or 5B. For example, the NOT-gate may be replaced by another inverting gate according to the implementation.

In the below description of FIG. 6, 7A, or 7B, reference may be made to an element in integrated circuit 100. It should be understood that in some cases the reference may additionally or alternatively be applied to an element in integrated circuit 400 (e.g., 400A or 400B), 500 (e.g., 500A or 500B), or 800 (e.g., 800A, 800B, 800C, or 800D—to be described below) even though not mentioned explicitly for simplicity's sake.

Figure 6:
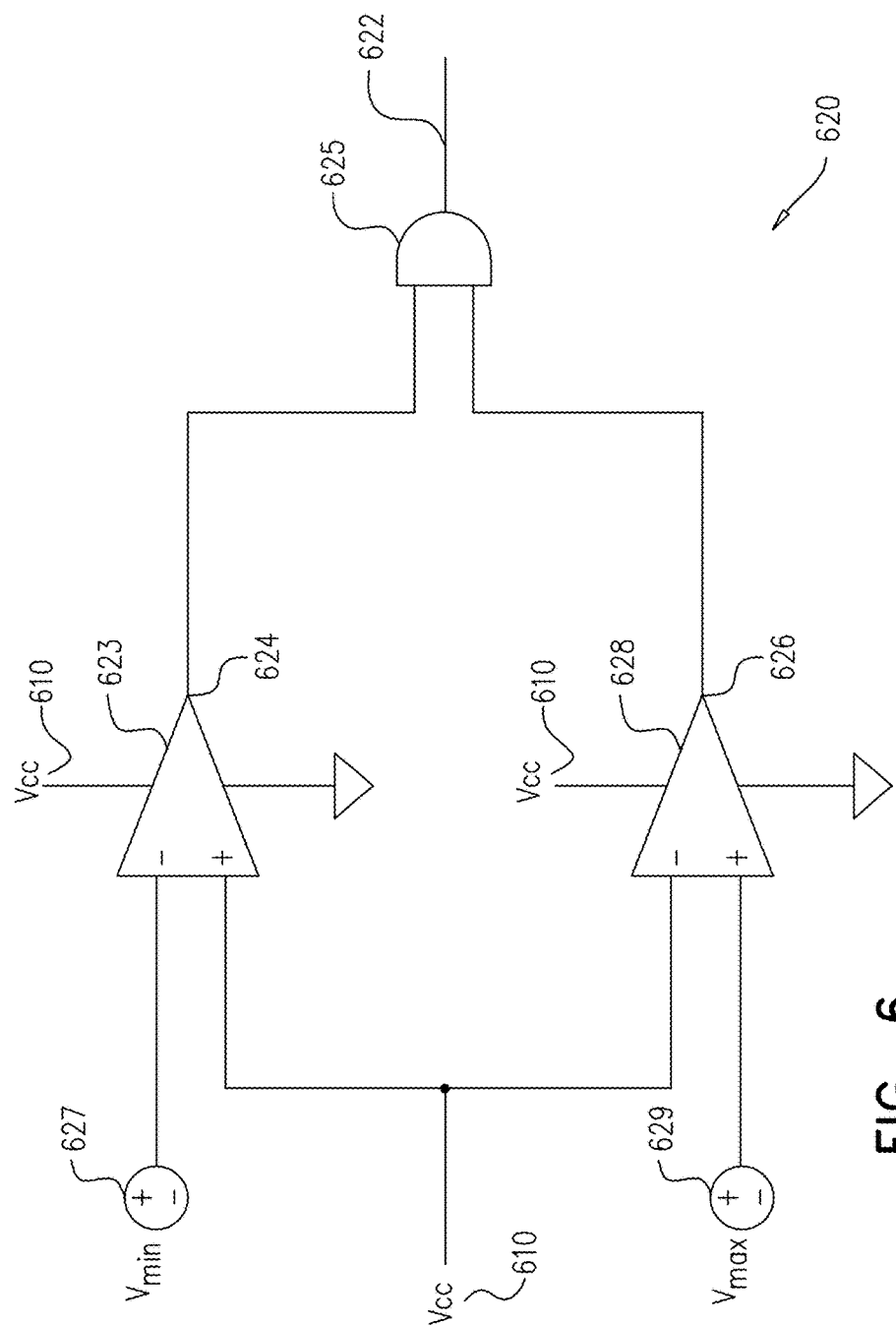
FIG. 6 is a schematic illustration of a detector, in accordance with some embodiments of the present disclosure.

FIG. 6 illustrates an example of a detector 620, in accordance with some embodiments of the present disclosure. Detector 620 may be an example of previously discussed detector 120 (FIGS. 1A and 1B). $V_{CC}$ 610 and output 622 may be examples of power input 110 and output 122 (FIGS. 1A and 1B) respectively. Detector 600 may be operative to detect an in-specification condition regarding the voltage at $V_{CC}$ 610, or in other words the voltage supplied to integrated circuit 100. In the illustrated embodiment, comparator 623 may compare the voltage at $V_{CC}$ 610 to a reference minimum voltage such as a lower boundary of a range that includes the nominal value for the voltage at $V_{CC}$ 610 for integrated circuit 100 that includes detector 620. This reference minimum voltage is depicted by a voltage source 627. Comparator 628 may compare the voltage at $V_{CC}$ 610 to a reference maximum voltage: such as an upper boundary of a range that includes the nominal value for the voltage at $V_{CC}$ 610. This reference maximum voltage is depicted by a voltage source 629. For instance, the lower boundary may be 2.45 V, assumed to be the minimum voltage specified which substantially guarantees a proper functionality of integrated circuit 100. The upper boundary may be 3.67 V, assumed to be the maximum voltage that is specified which substantially guarantees a proper functionality of integrated circuit 100. The output terminals 624 and 626 of comparators 623 and 628 may be coupled to an AND-gate 625. Output 622 may be outputted by AND-gate 625. Output 622 may be high only if the (actual) voltage at $V_{CC}$ 610 is between reference minimum voltage 627 and reference maximum voltage 629. Otherwise output 622 may be zero volts. A zero volts output may cause discharger 140 in integrated circuit 100 to discharge and/or normal operation of charger 170 to be disabled. Comparators 623 and 628 may be powered, for example by a power source external to integrated circuit 100 via $V_{CC}$ 610. Additionally or alternatively, comparators 623 and 628 may be powered by an internal power source as discussed above.

It should be evident that detector 620 of FIG. 6 is just one example of detector 120 that may be used in embodiments of the present disclosure, and that the arrangement of component(s) in detector 120 and the component(s) included in detector 120 may in some embodiments be different than what is illustrated in FIG. 6. For instance, the arrangement of component(s) in detector 120 and the component(s) included in detector 120 may vary depending on the condition(s) to be detected and/or depending on requirements on the output(s) from detector 120 with respect to discharger 140 and/or charger 170. For instance, the condition(s) may not necessarily relate to the voltage at $V_{CC}$ 610.

Figure 7:
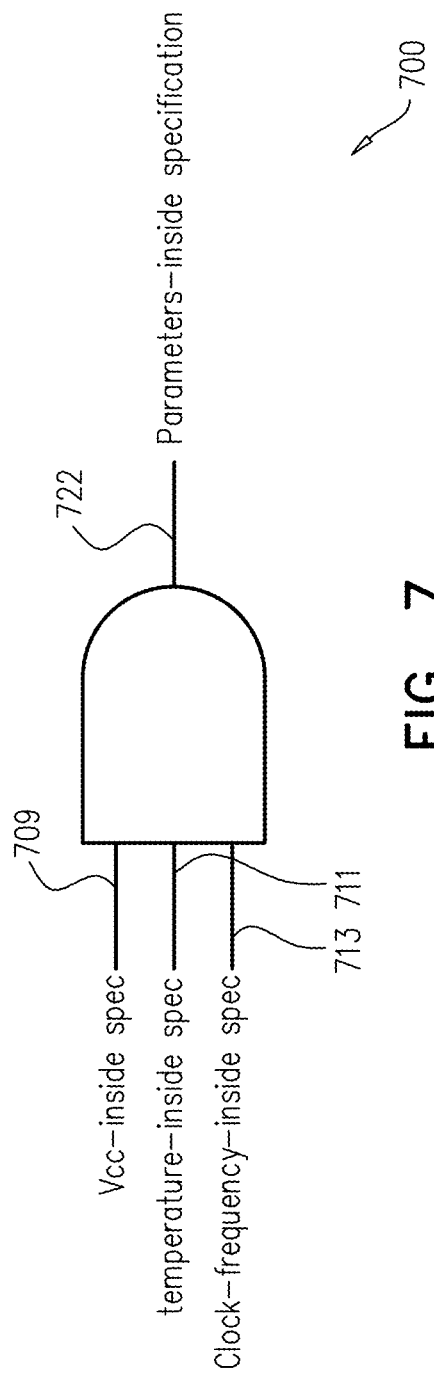
FIG. 7 is a schematic illustration of an aggregation element in a detector, in accordance with some embodiments of the present disclosure.

FIG. 7 illustrates an example of an aggregation element 700 in a detector, in accordance with some embodiments of the present disclosure.

In the illustrated embodiment, aggregation element 700 may be an AND-gate, whose output is labeled as 722. The detector which includes the aggregation element may be an example of previously discussed detector 120. Output 722 may be an example of output 122.

The AND-gate 700 may aggregate results of detecting in-specification conditions regarding various parameters. For example input 709 may be high only if the voltage at $V_{CC}$ 110 was detected as being within specification. Continuing with this example, the input terminal of AND-gate 700 which accepts input 709 may be coupled to the output terminal of AND-gate 625 of FIG. 6. Input 711 may be high only if the operating temperature of integrated circuit 100 was detected as being within specification. Input 713 may be high only if the clock frequency (i.e. clock rate) was detected as being within specification. Therefore output 722 may be high only if all of: the voltage at $V_{CC}$ 110, the temperature, and the clock frequency were within specification. Otherwise, output 722 may be zero, causing discharger 140 to discharge and/or normal operation of charger 170 to be disabled.

The results that may be aggregated are not bound by the example illustrated in FIG. 7 and in other examples additional, fewer and/or different results may be aggregated. Nor is the type of aggregation element bound by the example of an AND-gate, and in other embodiments, additional, fewer and/or different aggregation element(s) may be used.

In some of the embodiments described above with reference to charger 170, 470, or 570, the charger may be a power regulator designed to output a target voltage. Under normal operation, the voltage outputted by the power regulator may not exceed the lesser of the input voltage or the regulator targeted voltage. When the input voltage is below the regulator targeted voltage, the output voltage may follow the input voltage. When the input voltage is equal to or above the regulator targeted voltage, the voltage outputted by the power regulator may be the regulator target voltage. The value of the regulated target voltage may be any appropriate value. The composition of a power regulator that may be used as a charger in accordance with some embodiments of the present disclosure is not limited herein. For example, the power regulator may or may not include any of the following: a p-mos transistor whose gate may be coupled to an output terminal of detector 120, whose source may be connected to power input 110, and whose drain may be connected to discharger 140 and memory 160; an n-mos transistor whose gate may be coupled to an output terminal of detector 120, whose drain may be connected to power input 110, and whose source may be connected to discharger 140 and memory 160; a bipolar PNP transistor whose base may be coupled to an output terminal of detector 120, whose emitter may be connected to power input 110 and whose collector may be connected to discharger 140 and memory 160; or a bipolar NPN transistor whose base may be coupled to an output terminal of detector 120, whose collector may be connected to power input 110 and whose emitter may be connected to discharger 140 and memory 160. However, as mentioned above and as will be elaborated upon below in some other embodiments, charger 170 may be a switch.

FIGS. 8A, 8B, 8C, and 8D illustrate examples of a charger 870A, 870B, 870C, and 870D which is a switch positioned in an integrated circuit 800A, 800B, 800C, and 800D, in accordance with some embodiments of the present disclosure.

Any item in FIG. 8A, 8B, 8C, or 8D that is labeled in the format of 8xy (where x, y are digits that may or may not be the same) may be an example of an item labeled 1xy in FIGS. 1A and/or 1B. The illustrated embodiment of FIG. 8A, 8B, 8C, or 8D may include a detector 820. It is assumed that detector 820 may be operative to at least detect an in-specification voltage at $V_{CC}$ 810 and to provide a single output (at a single output terminal), which, only if an in-specification voltage at $V_{CC}$ 810 is detected, causes normal operation of charger 870 to be enabled.

Figure 8A:
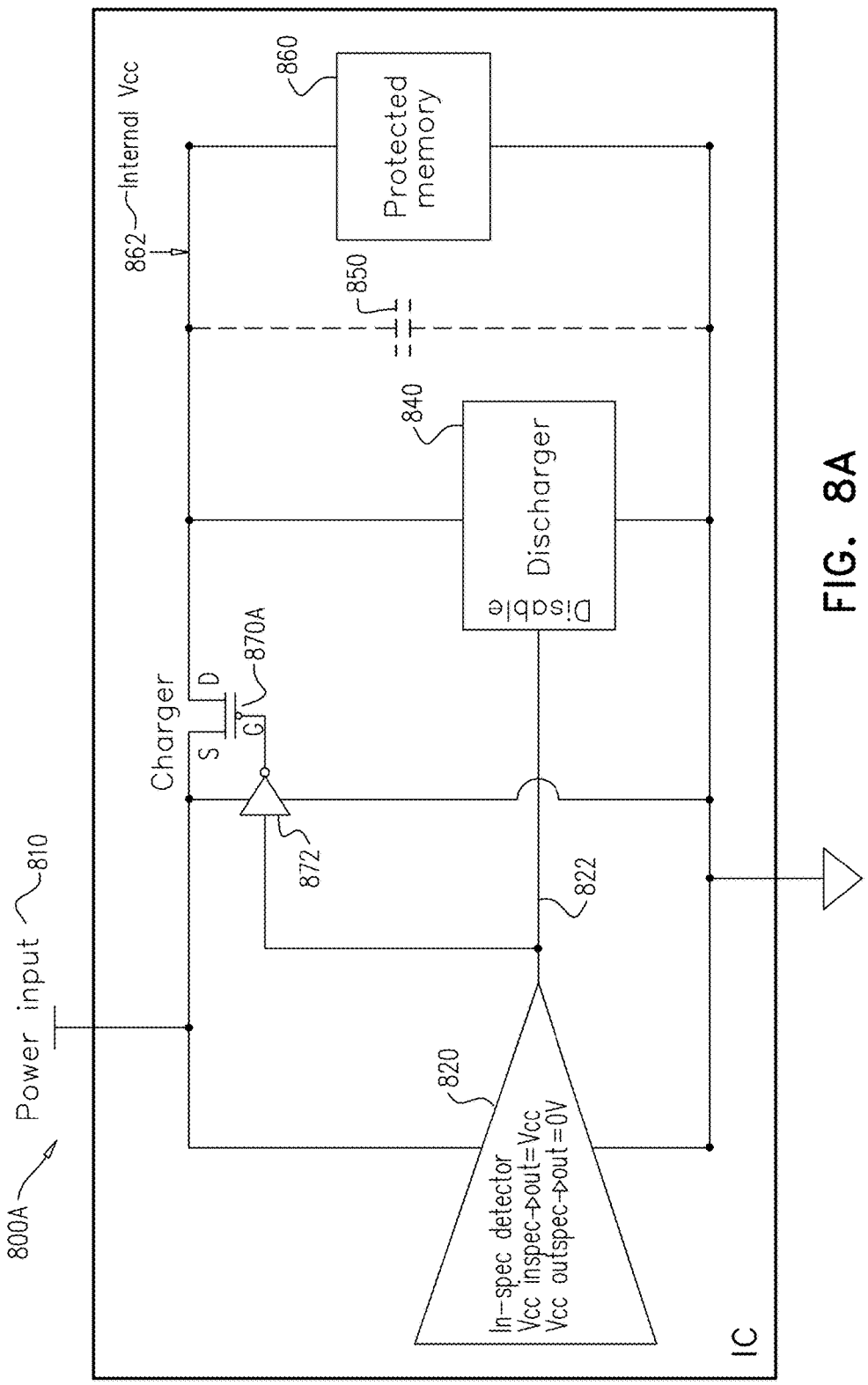
FIGS. 8A, 8B, 8C, and 8D are schematic illustrations of a charger which is a switch positioned in an integrated circuit, in accordance with some embodiments of the present disclosure.

In FIG. 8A, charger 870A is shown implemented using a pMOSFET ("p-mos") transistor. The source ("s") of p-mos transistor 870A may be connected to $V_{CC}$ 810 and the drain ("d") may be connected to discharger 840 and memory 860.

The gate ('g") of transistor 870A may be considered to be coupled to an output terminal of detector 820, as the output terminal of detector 820 may be connected to an input terminal of a NOT-gate 872 and the output terminal of NOT-gate 872 may be connected to the gate of transistor 870A. NOT-gate 872 may be powered from $V_{CC}$ 810.

P-mos transistor 870A may behave as a closed switch (charging internal $V_{CC}$ 862) when the gate terminal voltage is lower than the source ("s") terminal voltage and the absolute value of the voltage difference between the gate and the source of the transistor, i.e. $|V_{GS}|$, is higher than the threshold voltage. Otherwise, transistor 870A may act as an open switch (and not charge internal $V_{CC}$ 862).

When $V_{CC}$ 810 is within specification, detector 820 may set output 822 voltage to a high value (e.g., approximately equal to the voltage at $V_{CC}$ 810) as an indication of in-specification condition detection, and consequently the voltage at the output of the NOT-gate 872 as well as the gate terminal voltage of transistor 870A may be set to low value (e.g., approximately 0 volts). Since the gate terminal voltage of transistor 870A is lower than the source terminal voltage, and the absolute value of the voltage difference between the gate and the source of the transistor, i.e. $|V_{GS}|$, is higher than the threshold voltage, transistor 870A may act as a closed switch and charges internal $V_{CC}$ 862.

On the other hand, when $V_{CC}$ 810 is not within specification, or detector 820 fails to detect the in-specification condition for any other reason, the detector output voltage 822 may be set to a low value (e.g., approximately 0 volts) as an indication of in-specification condition non-detection, and consequently the voltage at the output of the NOT-gate 872 as well as the gate terminal voltage of transistor 870A may be set to a high value (e.g. approximately equal to the voltage at $V_{CC}$ 810). Since $|V_{GS}|$ of transistor 870A is approximately 0 volts, and therefore lower than the threshold voltage, transistor 870A may act as an open switch and not charge (or otherwise affect) internal $V_{CC}$ 862. Since NOT-gate 872 is powered from $V_{CC}$ 810, switch 870A may be open, even when $V_{CC}$ 810 is below the specified working voltage.

Figure 8B:
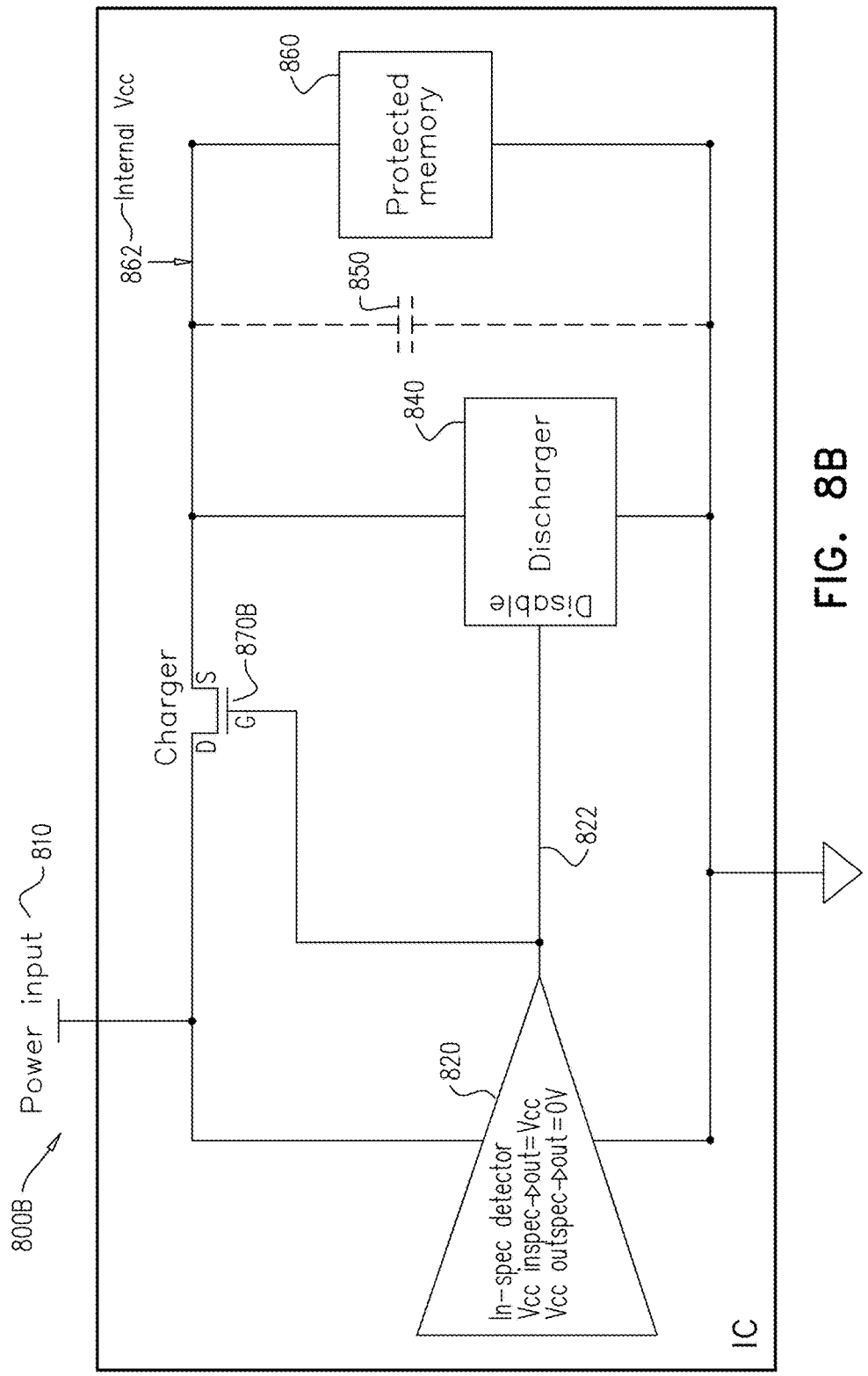

In FIG. 8B, charger 870B is shown implemented using an nMOSFET ("n-mos") transistor. The drain ("d") of n-mos transistor 876B may be connected to $V_{CC}$ 810 and the source ("s") may be connected to discharger 840 and memory 860.

The gate ('g") of transistor 876B may be coupled to an output terminal of detector 820. The n-mos transistor 870B may behave as a closed switch (charging internal $V_{CC}$ 862) when the gate terminal voltage is higher than the source terminal voltage and the value of the voltage difference between the gate and the source of the transistor, i.e. $V_{GS}$, is higher than the threshold voltage. Otherwise, transistor 870B may act as an open switch (and not charge internal $V_{CC}$ 862).

When $V_{CC}$ 810 is within specification, detector 820 may set output voltage 822 to a high value (e.g., approximately equal to the voltage at $V_{CC}$ 810) as an indication of in-specification condition detection, and consequently set transistor 870B gate terminal voltage to approximately the same value (e.g., approximately equal to the voltage at $V_{CC}$ 810.) As long as the gate terminal voltage of transistor 870B is higher than the source terminal voltage, and the voltage difference between the gate and the source of the transistor, i.e. $V_{GS}$, is higher than the threshold voltage, transistor 870B may act as a closed switch and charge internal $V_{CC}$ 862.

On the other hand, when $V_{CC}$ 810 is not within specification, or detector 820 fails to detect the in-specification condition for any other reason, the detector output voltage 822 may be set to a low value (e.g., approximately 0 volts) as an indication of in-specification condition non-detection, and consequently the gate terminal voltage of transistor 870B may be set to approximately the same voltage (e.g., approximately 0 volts). Since $V_{GS}$ of transistor 870B is approximately 0 volts or negative, and therefore lower than the threshold voltage, transistor 870B may act as an open switch and not charge (or otherwise affect) internal $V_{CC}$ 862.

Figure 8C:
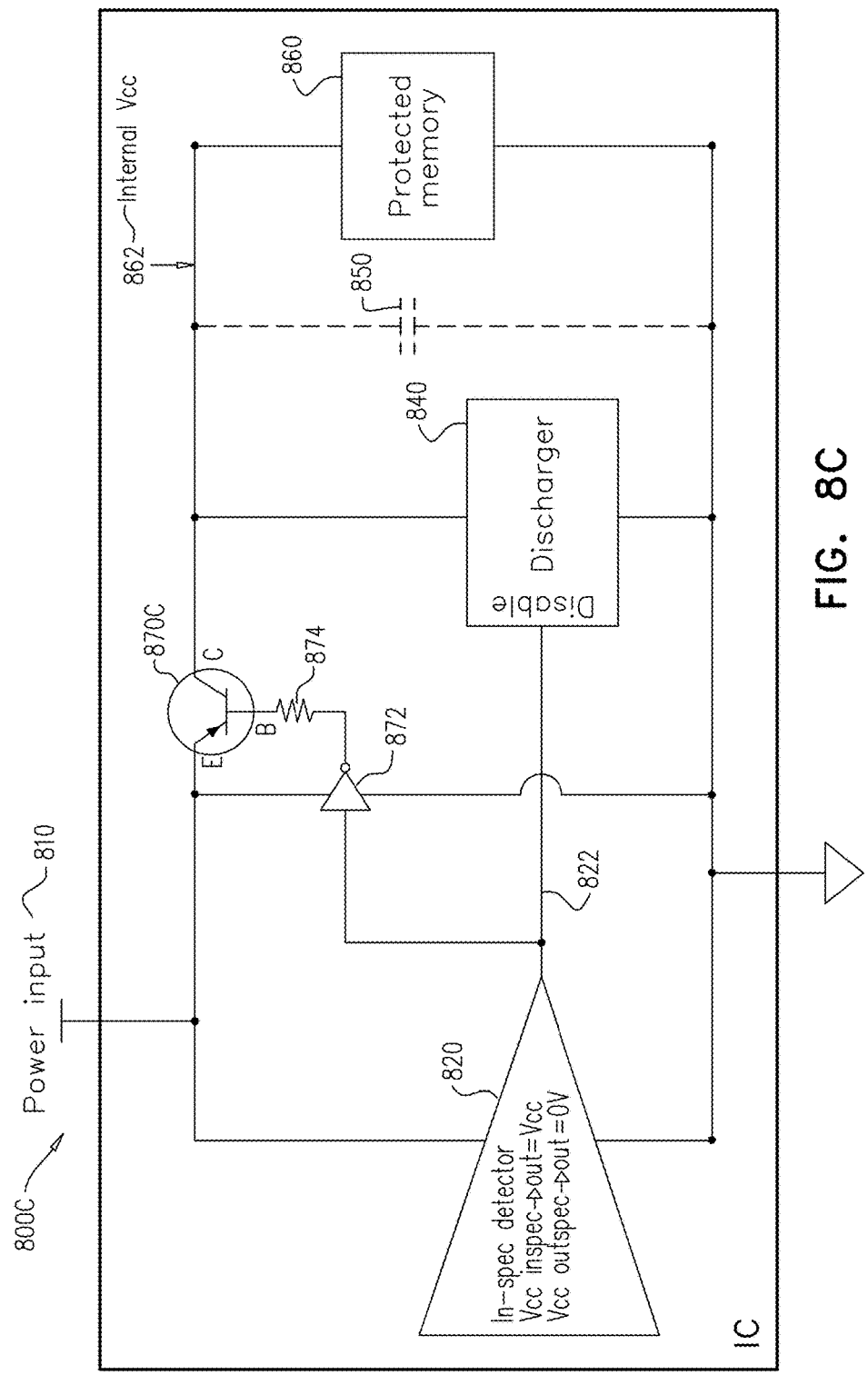

In FIG. 8C, charger 870C is shown implemented using a bi-polar PNP transistor 870C. The emitter ("E") of bi-polar PNP transistor 870C may be connected to $V_{CC}$ 810 and the collector ("C") may be connected to discharger 840 and memory 860.

The base ("B") of transistor 870C may be considered to be coupled to an output terminal of detector 820, as the output terminal may be connected to the input terminal of a NOT-gate 872 and the output terminal of NOT-gate 872 may be connected to the base of transistor 870C via a resistor 874. NOT-gate 872 may be powered from $V_{CC}$ 810.

PNP transistor 870C may behave as a closed switch (charging internal $V_{CC}$ 862) when the base terminal voltage is lower than the emitter terminal voltage and the absolute value of the voltage difference between the base and the emitter of the transistor, i.e. $|V_{BE}|$, is higher than the cut-off voltage. Otherwise, transistor 870C may act as an open switch (and not charge internal $V_{CC}$ 862).

When $V_{CC}$ 810 is within specification, detector 820 may set output voltage 822 to a high value (e.g., approximately equal to the voltage at $V_{CC}$ 810) as an indication of in-specification condition detection, and consequently the voltage at the output of NOT-gate 872 as well as the base terminal voltage of transistor 870C may be set to a low value (e.g., approximately 0 volts). Since the base terminal voltage of transistor 870C is lower than the emitter terminal voltage, and the absolute value of the voltage difference between the base and the emitter of the transistor, i.e. $|V_{BE}|$, is higher than the cut-off voltage, transistor 870C may act as a closed switch and charge internal $V_{CC}$ 862.

On the other hand, when $V_{CC}$ 810 is not within specification, or detector 820 fails to detect the in-specification condition for any other reason, the detector output voltage 822 may be set to a low value (e.g., approximately 0 volts) as an indication of in-specification condition non-detection, and consequently the voltage at the output of the NOT-gate 872 as well as the base terminal voltage of transistor 870C may be approximately set to a high value (e.g. approximately equal to the voltage at $V_{CC}$ 810). Since $|V_{BE}|$ of transistor 870C is approximately 0 volts, lower than the cut-off voltage, transistor 870C may act as an open switch and not charge (or otherwise affect) internal $V_{CC}$ 862. Since NOT-gate 872 is powered from $V_{CC}$ 810, switch 870C may be open, even when $V_{CC}$ 810 is below the specified working voltage.

Figure 8D:
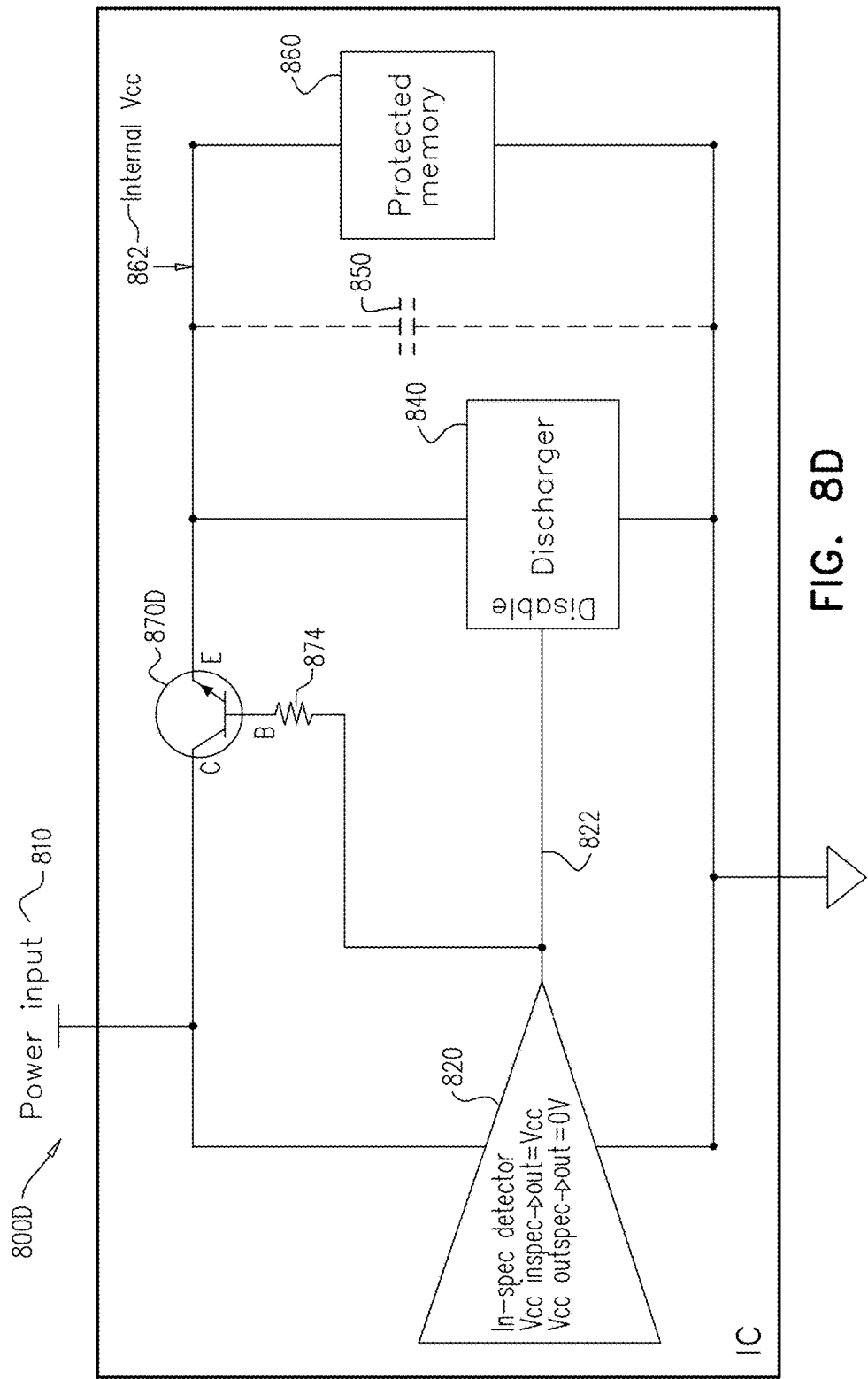

In FIG. 8D, charger 870D is shown implemented using a bi-polar NPN transistor 870D. The collector ("C") of bi-polar PNP transistor 870D may be connected to $V_{CC}$ 810 and the emitter ("E") may be connected to discharger 840 and memory 860. The base ("B") of transistor 870D may be coupled to an output terminal 822 of detector 820 via a resistor 874.

The NPN transistor 870D may behave as a closed switch (charging internal $V_{CC}$ 862) when the base terminal voltage is higher than the emitter terminal voltage and the value of the voltage difference between the base and the emitter of the transistor, i.e. $V_{BE}$, is higher than the cut-off voltage. Otherwise, transistor 870D may act as an open switch (and not charge internal $V_{CC}$ 862).

When $V_{CC}$ 810 is within specification, detector 820 may set output voltage 822 to a high value (e.g., approximately equal to the voltage at VCC 810) as an indication of in-specification condition detection, and consequently set transistor 870D base terminal voltage to the same value (e.g. approximately equal to the voltage at $V_{CC}$ 810.) As long as the base terminal voltage of transistor 870D is higher than the emitter terminal voltage, and the absolute value of the voltage difference between the base and the emitter of transistor 870D, i.e. $V_{BE}$, is higher than the cut-off voltage, transistor 870D may act as a close switch and charge internal $V_{CC}$ 862.

On the other hand, when $V_{CC}$ 810 is not within specification, or detector 820 fails to detect the in-specification condition for any other reason, the detector output voltage 822 voltage may be set to a low value (e.g., approximately 0 volts) as an indication of in-specification condition non-detection, and consequently the base terminal voltage of transistor 870D may be set to a low value (e.g., approximately 0 volts). Since $V_{BE}$ of transistor 870D is approximately 0 volts or negative, and therefore lower than the cut-off voltage, transistor 870D may act as an open switch and not charge (or otherwise affect) internal $V_{CC}$ 862.

The subject matter does not require that a charger 170 (FIG. 1B) that is a switch have the features of transistor 870A, 870B, 870C, or 870D described with reference to FIG. 8A, 8B, 8C or 8D. Charger 170 that is a switch may be made up of any type(s) and number of component(s). If charger 170 is a switch that includes transistor(s), any number and type(s) of transistor(s) may be used, as appropriate to the implementation, and not necessarily transistor 870A, 870B, 870C, or 870D. Furthermore, the subject matter is not bound by the elements nor by the arrangement of elements shown in FIG. 8A, 8B, 8C or 8D. For example the NOT-gate may be replaced by other inverting gate according to the implementation.

The type(s) of integrated circuit for which embodiments of the present disclosure may be relevant are not limited herein. In some embodiments integrated circuit 100, 400 500, or 800 may be a microcontroller or may include a microcontroller but in other embodiments this may not necessarily be the case.

Integrated circuit 100, 400 500, or 800 may or may not be included in a system. The type of system that may include integrated circuit 100, 400, 500, or 800 is not limited herein. However for the sake of further illustration some examples are now provided. For example, the system may be a computer that may include one or more of any of: integrated circuit 100, 400 500, or 800. The term computer should be expansively construed to cover any kind of electronic device that may have data processing capabilities and that may be made up of any combination of hardware, software and/or firmware such as a personal computer, laptop, communication device, smartphone, server, etc. In another example, the system may be a memory device that may include one or more of any of: integrated circuit 100, 400 or 500. In another example, the system may be a smart card which may include one or more of any of: integrated circuit 100, 400, 500, or 800. In another example, the system may include a smart card, which may include one or more of any of: integrated circuit 100, 400, 500, or 800 and a reader operative to provide power to the smart card.

Some advantages of some embodiments of the present disclosure will now be described.

First, in some embodiments, a discharger that is included in an integrated circuit may be operative to discharge stored charge if the detector fails to detect a condition as a consequence of no power or insufficient power to perform detection being provided to the detector. This may be advantageous in case power to the detector is cut off (or reduced below the minimal operational voltage of the detector), e.g., during an attack.

Second, in some embodiments, having the discharger inside the integrated circuit that includes the volatile memory that is being protected may be advantageous. A discharger inside the integrated circuit may be more secure against an attack than a discharger outside the integrated circuit.

Third, in some embodiments an integrated circuit that includes a volatile memory, and a discharger that is external to the volatile memory but within the integrated circuit, may allow a commercially available (i.e. off the shelf) volatile memory to be embedded inside the integrated circuit, meaning that the volatile memory may not need to be specially designed for use in the integrated circuit. In some cases of these embodiments, the same discharger may be positioned inside the integrated circuit but outside of the volatile memory, regardless of the type(s) and number of memory cells in the volatile memory.

Fourth, in some embodiments, soon after at least one actual value of a parameter relating to at least one of one or more in-specification conditions stray(s) outside of specification, a detector included in the integrated circuit may not detect the at least one in-specification condition, and therefore may provide a presumably timely discovery of this event. This event may or may not be a consequence of an attack, and in the case that the event is a consequence of an attack the detection may provide a presumably timely discovery of an attack.

Fifth, in some embodiments, having the detector inside the integrated circuit that includes the volatile memory that is being protected may be advantageous. A detector inside the integrated circuit may be more secure against an attack than a detector outside the integrated circuit.

Sixth, in some embodiments the discharging by a discharger and optionally the disabling of normal operation of a charger discussed herein may be advantageous over other protection mechanisms. The discharger, the detector and the charger in accordance with some of these embodiments may be analog. Analog may be advantageous over digital, as digital functionality may be dependent on a working clock. For instance, consider another possible protection mechanism which includes an active overwriting of data in volatile memory. Such a protection mechanism may be sabotaged by lowering the voltage supplied to the integrated circuit to a level where the clock required by a digital element to overwrite the data in volatile memory cannot function. The (lowered) voltage level may be above the data erase voltage and therefore the original data in the volatile memory may be retained. Therefore in some attacks, such other protection mechanisms may not work properly and may allow data to be retained in volatile memory.

Seventh, in some embodiments, the protection mechanisms discussed herein such as the discharging by a discharger and optionally the disabling of normal operation of a charger if at least one in-specification condition is not detected by a detector may not substantially change the area of the integrated circuit compared to an integrated circuit without these mechanisms. For instance, consider a discharger that includes say only a few transistors (or even one transistor) and it is apparent that such as discharger may have negligible impact on the size of the integrated circuit. Other advantages may be apparent to the reader from the description above.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will further be appreciated by persons skilled in the art that the present disclosure is not limited by what has been particularly shown and described hereinabove. Rather the scope of the disclosure is defined by the appended claims and equivalents thereof.

What is claimed is:

1. An integrated circuit, comprising:
   a volatile memory including a plurality of memory cells;
   a detector, external to the volatile memory, to detect one or more in-specification conditions; and
   a discharger, external to the volatile memory, to discharge electric charge stored in the integrated circuit, including electric charge stored in the volatile memory, unless the detector detects said one or more in-specification conditions.

2. The integrated circuit of claim 1, wherein said discharger includes at least one p-mos or bipolar PNP transistor,
   wherein: a source and a drain of each of the at least one p-mos transistor are connected to the volatile memory and a gate of each of the at least one p-mos transistor is coupled to the detector; or
   an emitter and a collector of each of the at least one bipolar PNP transistor are connected to the volatile memory and a base of each of the at least one bipolar PNP transistor is coupled to the detector.

3. The integrated circuit of claim 1, wherein said discharger includes at least one n-mos or bipolar NPN transistor,
   wherein: a source and a drain of each of the at least one n-mos transistor are connected to the volatile memory, and a gate of each of the at least one n-mos transistor is coupled to the detector via a gate that is powered by a voltage that is also powering the volatile memory; or
   an emitter and a collector of each of the at least one bipolar PNP transistor are connected to the volatile memory and a base of each of the at least one bipolar PNP transistor is coupled to the detector via a gate that is powered by a voltage that is also powering the volatile memory.

4. The integrated circuit of claim 1, wherein said one or more in-specification conditions includes that for each of at least one parameter, the parameter is within a predetermined range that includes a nominal value of the parameter for the integrated circuit.

5. The integrated circuit of claim 4, wherein said at least one parameter includes a voltage supplied to the integrated circuit.

6. The integrated circuit of claim 4, wherein said at least one parameter includes one or more selected from a group comprising: temperature, clock rate, power, voltage, voltage difference, light absorption, radiation absorption, or current.

7. The integrated circuit of claim 1, wherein said discharger is operative to discharge if said detector does not detect at least one of said one or more in-specification conditions due to at least one of:
   for at least one parameter, the parameter is not within a predetermined range including a nominal value of the parameter for the integrated circuit; or
   no power or insufficient power to perform detection is provided to the detector.

8. The integrated circuit of claim 1, further comprising a charger operative to provide a positive voltage for powering the volatile memory only if a power source that is external to the integrated circuit is supplying power to the integrated circuit and the detector detects said one or more in-specification conditions.

9. The integrated circuit of claim 8, wherein said charger is a power regulator or a switch.

10. The integrated circuit of claim 8 wherein said charger includes at least one n-mos or bipolar NPN transistor.

11. The integrated circuit of claim 10, wherein:
    a gate of each of said at least one n-mos transistor is coupled to the detector, and a source of each of said at least one n-mos is connected to the volatile memory; or
    a base of each of said at least one bipolar NPN transistor is coupled to the detector, and an emitter of each of said at least bipolar NPN transistor is coupled to the volatile memory.

12. The integrated circuit of claim 1, wherein said plurality of memory cells includes memory cells of different types.

13. The integrated circuit of claim 1, wherein said integrated circuit is or includes a microcontroller.

14. A system comprising an integrated circuit, the integrated circuit including:
   a volatile memory including a plurality of memory cells;
   a detector that is in the integrated circuit but external to the volatile memory to detect one or more in-specification conditions; and
   a discharger that is in the integrated circuit but external to the volatile memory to discharge electric charge stored in the integrated circuit, including electric charge stored in the volatile memory, unless the detector detects said one or more in-specification conditions.

15. The system of claim 14, wherein said system is a smart card, a memory device, or a computer.

16. The system of claim 14, wherein said system includes a smart card that includes the integrated circuit, said system further comprising a reader configured to provide power to the smart card.

17. A method of protecting data in volatile memory that includes a plurality of memory cells in an integrated circuit, the method comprising:
   determining that at least one of one or more in-specification conditions is not detected by a detector that is in the integrated circuit but external to the volatile memory; and
   based on said determining, discharging electric charge stored in the integrated circuit, including electric charge stored in the volatile memory by a discharger that is in the integrated circuit but external to the volatile memory.

18. The method of claim 17, further comprising:
   based on said determining, not providing power to the volatile memory by a charger.

19. The method of claim 17, wherein said at least one in-specification condition is not detected due to at least one of:
   for at least one parameter, the parameter is not within a predetermined range that includes a nominal value of the parameter for the integrated circuit, or
   no power or insufficient power to perform detection is provided.

20. The method of claim 17, wherein the discharging causes a voltage across the volatile memory to be reduced.

* * * * *